(12) United States Patent
Naftali et al.

(10) Patent No.: US 9,769,444 B2
(45) Date of Patent: Sep. 19, 2017

(54) SYSTEM AND METHOD FOR CORRECTING OPTICAL DISTORTIONS WHEN PROJECTING 2D IMAGES ONTO 2D SURFACES

(71) Applicant: MARADIN TECHNOLOGIES LTD., Yoqne'Am (IL)

(72) Inventors: Matan Naftali, Moshav Aloney-Aba (IL); Menashe Yehiel, Moshav Yogev (IL); Gad Yearim, Haifa (IL)

(73) Assignee: MARADIN TECHNOLOGIES LTD., Yoqne'am (IL)

( * ) Notice: Subject to any disclaimer, the term of this patent is extended or adjusted under 35 U.S.C. 154(b) by 0 days.

(21) Appl. No.: 15/250,033

(22) Filed: Aug. 29, 2016

(65) Prior Publication Data

US 2017/0054958 A1 Feb. 23, 2017

Related U.S. Application Data

(63) Continuation of application No. 14/405,011, filed as application No. PCT/IL2013/050469 on Jun. 2, 2013, now Pat. No. 9,456,172.

(Continued)

(51) Int. Cl.
*H04N 9/31* (2006.01)
*G03B 21/00* (2006.01)
(Continued)

(52) U.S. Cl.
CPC ......... *H04N 9/3185* (2013.01); *G02B 26/101* (2013.01); *G03B 21/008* (2013.01);
(Continued)

(58) Field of Classification Search
CPC .. G02B 26/101; G03B 21/008; G03B 21/147; G03B 21/2033; H04N 5/7458; H04N 9/3129; H04N 9/3161; H04N 9/3185
See application file for complete search history.

(56) References Cited

U.S. PATENT DOCUMENTS 6,219,011 B1 4/2001 Aloni et al.
6,456,339 B1 9/2002 Surati et al.
(Continued)

*Primary Examiner* — Edward Park
(74) *Attorney, Agent, or Firm* — Browdy and Neimark, P.L.L.C.

(57) ABSTRACT

A system for projecting 2D images, providing a computerized representation of a first, dense, grid of spatial 3D coordinates which respectively correspond to a set of time-points evenly distributed along a time-dimension with constant time-discretization; deriving a dense 2D representation of an image, whose coordinate pairs respectively correspond to said set of time-points; d. Defining a sparse 2D grid of second coordinate pairs, spaced such that distances between any two adjacent coordinate pairs along a row of said sparse 2D grid are constant; and finding, coordinate pairs closest to the second sparser grid to yield a third grid, and a laser controller to control the laser to project a digitally represented image, from said distance, timed to project pixels whose locations respectively correspond to the subset of uniformly distanced positions forming said third grid, thereby to prevent image distortion despite non-uniformity of micro-mirror's angular velocity.

13 Claims, 24 Drawing Sheets

Related U.S. Application Data

(60) Provisional application No. 61/654,817, filed on Jun. 2, 2012.

(51) Int. Cl.
*G03B 21/14* (2006.01)
*G02B 26/10* (2006.01)
*H04N 5/74* (2006.01)
*G03B 21/20* (2006.01)

(52) U.S. Cl.
CPC ....... *G03B 21/147* (2013.01); *G03B 21/2033* (2013.01); *H04N 5/7458* (2013.01); *H04N 9/3129* (2013.01); *H04N 9/3161* (2013.01)

(56) References Cited

U.S. PATENT DOCUMENTS

| | | |
|---|---|---|
| 7,905,607 B2 | 3/2011 | Takatsu et al. |
| 2002/0015052 A1 | 2/2002 | Deering |
| 2004/0141157 A1 | 7/2004 | Ramachandran et al. |
| 2006/0050074 A1 | 3/2006 | Bassi |
| 2007/0115440 A1 | 5/2007 | Wiklof |
| 2010/0033791 A1 | 2/2010 | Nakanishi |
| 2011/0013097 A1* | 1/2011 | Freeman .............. H04N 9/3129 348/745 |
| 2011/0141441 A1 | 6/2011 | Konno et al. |
| 2011/0141442 A1* | 6/2011 | Auerbach .............. G03B 21/14 353/94 |
| 2011/0148789 A1 | 6/2011 | Kim et al. |

* cited by examiner

Fig. 1a

> 5: provide laser projecting beam onto mirror and screen onto which the coherent light reflected from the mirror impinges.

> 10: use processor to (typically analytically) characterize mirror's angular deflection along each of the x, y axes e.g. as per Fig. 2, using time discretization, defined by the laser modulation frequency, to describe the mirror's angular deflection along the fast scan axis and discretization of space to describe the mirror's angular deflection along the slow scan axis. Use this info to compute Virtual 3d Body = total volume of light reflected from the mirror as the laser beam impinges on the mirror and the mirror pivots along both axes (e.g. as per Fig. 2)

> 15: use processor to compute portion of Virtual 3d Body's surface area bounded by making 4 virtual planar slices in the Virtual 3d Body, where the 4 slices intersect at a single point which is the center of the mirror's reflective surface.

> 20: use processor to define dense grid ("grid I" or "spatial grid I") of points (each having x, y, z coordinates in space) covering most or all of Virtual 3d Body's surface area portion computed in step 15. Store time-stamp corresponding to each point e.g. Define range of angular deflection for each of the coordinates, where the range of the angular deflection in both axes defines the vertices of the grid. Example (assuming a laser modulation clock of, say, 150MHz and mirror resonance frequency of, say, 10150Hz):
> { Rx=[7390,600] , Ry=[7390,600], Rz=[7390,600] }

> 30: use processor to compute intersection (e.g. as illustrated in Fig. 9) between a plane, and the portion of the Virtual 3d Body bounded by (a) the surface area portion computed in step 15 and (b) said single point (e.g. as per Fig. 5) thereby to define a dense 2D grid of coordinate pairs ("grid II" or "spatial grid II")

to Fig. 1b, step 40

Fig. 1b                           from Fig. 1a, step 30

40: use processor to define a sparse grid of points ("grid III" or "spatial grid III") (each having x, y coordinates) covering most or all (say 90 - 95%) of intersection computed in step 30 (e.g. as per Fig. 6). Example:

$$\begin{bmatrix} p_{1,1} & p_{1,2} & \cdots & p_{1,854} \\ p_{2,1} & p_{1,2} & & p_{2,854} \\ p_{600,1} & & \cdots & p_{600,854} \end{bmatrix}$$

50: generate timing information grid (also termed herein Grid IV) : for each sparse grid point in grid III, identify the closest point thereto in grid II and retrieve time-stamp of the closest point, thereby to generate a matrix of time-stamps. Example:

$$\begin{bmatrix} t_{1,1} & t_{1,2} & \cdots & t_{1,854} \\ t_{2,1} & t_{1,2} & & t_{2,854} \\ t_{600,1} & & \cdots & t_{600,854} \end{bmatrix}$$

55: use processor to compute pixel duration data/file/matrix, also termed 'on-time' matrix, representing time 'on' to project each pixel. Example:

$$\begin{bmatrix} d_{1,1} & d_{1,2} & \cdots & d_{1,854} \\ d_{2,1} & d_{1,2} & & d_{2,854} \\ d_{600,1} & & \cdots & d_{600,854} \end{bmatrix}$$

60: operate laser, using time-stamp information (e.g. timing information grid generated in step 50 and pixel duration data generated in step 55) to modulate the laser, e.g. as per Fig. 26

Fig. 2

| 210: | Define mirror's parameters, Laser characteristics (e.g. pixel resolution of the fast and slow scan directions of the mirror, mirror resonance frequency, laser modulation clock, distance from mirror to screen), where: $N_H, N_V$ are the resolution of the fast and slow scan directions, respectively $L_{clk}$ and dt $=1/L_{clk}$ are the laser modulation clock having a specific frequency (Hz) and the time discretization value dt (sec), respectively f is the mirror resonance frequency D is the distance between the mirror and the screen e.g as per Fig. 3 |
|---|---|
| 220: | Compute a time vector which has constant dt (M), and is spanned from $t_0$=0 to $t_f$=1/(2f) t_final = 1/(2 x frequency):t=[0:dt:1/2f]. time vector is then used to derive the coordinates in space, according to this specific time-vector, since behavior is time dependent rather than constant over time. |
| 230: | Derive the mirror kinematics in both axes, where the mirror angular deflection along the fast scan axis is time dependent, and the mirror angular deflection along the slow scan is described using discretization of the space e.g. as per Fig. 4. Example: Angular deflection around the fast-scan axis: $\theta_x = \overline{\theta_x} \cos(2\pi f \cdot t)$ angular deflection around the slow-scan axis: $\theta_y = [-\overline{\theta_y} : d\theta_y : \overline{\theta_y}]$ |

Fig. 3

| | |
|---|---|
| 310: | Define a pixel resolution to be employed for the fast and slow scan directions of the mirror. Example: $N_H = 854$ $N_V = 600$ |
| 320: | Define a laser modulation clock ($L_{clk}$), and a constant dt ($1/L_{clk}$) Example: $L_{clk} = 150$ MHz $dt = 6.66 \cdot 10^{-9}$ [sec] |
| 330: | Define mirror resonance frequency (f) Example: $f = 10150$ [Hz] |

Fig. 4

| | |
|---|---|
| 450: | Derive the mirror kinematics (mirror angular motion along the fast scan axis), and compute the motion in terms of the time vector e.g. by expressing the motion analytically in terms of the time vector Example: $\theta_x = \overline{\theta_x} \cos(2\pi f \cdot t)$ |
| 460: | Define the mirror deflection vector along the slow scan axis ($\overline{\theta_y}$ is the amplitude of deflection along the slow scan axis) Example: $\theta_y = [-\overline{\theta_y} : d\theta_y : \overline{\theta_y}]$ |
| 470: | Define the distance D between the mirror and the screen Example: $D = 0.55$ [m] |

Fig. 5

| | |
|---|---|
| 510: | Given a 3-dimensional description (coordinates in space) of a body Comprising a 3D portion of a sphere with constant arbitrary radius extending outward from mirror's center) Where: Rx, Ry, Rz are 3 respective matrices of coordinates which are defined in space of the surface of the body |
| 520: | Given a planar surface $Ax+By+Cz+D=0$ Where x, y, and z are axes of a Cartesian Coordinate system, and A, B, C, D are constants Where the 2D plane intersects the 3D body |
| 530: | Compute the unit-length vector of each one of the coordinates: $Rj\_unit = Rj/R$ Where j = x, y, z and R is the radius of the body |
| 540: | For each one of the lines: For each one of the pixels along the line: Find a stretching\compressing parameter ($\beta$) such that the unit-length coordinates multiplied by $\beta$ lie on the 2D surface Return the matrix of $\beta$'s |

Fig. 6

| | |
|---|---|
| 660: | Analyze (e.g. as per Fig. 7) the geometrical properties obtained for the projected image on the 2D plane:<br>• Do you need it? Compute the narrower width of the projected image along the fast scan axis (FOV)<br>• And these? Define a constant distance between any two successive pixels (dp) along the FOV, which depends on $N_H$ |
| 670: | use the projected image properties found in step 260, in order to generate the sparse grid |

Fig. 7

| | |
|---|---|
| 800: | Compute the dense grid of coordinates on the 2D plane that is parallel to the mirror with distance D (Px, Py are the coordinates of the intersection of the 3D surface on the 2D plane)<br>Example:<br>{ Px=[7390,600] , Py=[7390,600] } |
| 810: | Compute the width of the center of the projected image along the fast scan axis (FOV)<br>Example:<br>FOV = 0.36[m] |
| 820: | Define a constant distance between any two successive pixels (dp) along the FOV, which depends on $N_H$<br>Example:<br>dp=FOV/($N_H - 1$) = 0.422[mm] |

| Parameters | Definitions |
| --- | --- |
| $\alpha_L$ | Laser impinging angle |
| $d_s$ | Distance from mirror to screen |
| $\theta_{peak}^{O_p,x}$ [rad] | Maximum Horizontal Optical Angle - Peak |
| $\theta_{peak}^{O_p,y}$ [rad] | Maximum Vertical Mechanical Angle - Peak |

Fig. 21

| Parameters | Definitions |
| --- | --- |
| $N_h$ | No. of pixels (horizontal) |
| $f_n$ [Hz] | Natural frequency (horizontal) |
| $\omega_n$ [rad/sec] | $\omega_n = 2\pi f_n$ |
| $\theta_{peak}^{M,x}$ [rad] | Maximum horizontal Mechanical Angle - Peak |

✦　　✦　　✦　　✦　　✦　　✦　　✦　　✦　　✦ i　　ii　　iii　　iv　　v　　vi　　vii　　viii　　ix

| Points in Grid II | 3 | 5 | 7 | 9 | 12 | 15 | 18 | 20 | 22 |
|---|---|---|---|---|---|---|---|---|---|
| Points in Grid IV | i | ii | iii | iv | v | vi | vii | viii | ix |

Step 2510: given a dense 2D grid II, and a sparse 2D grid III, represented by matrices II, III respectively, whose dimensions match the total number of rows and columns of the grids, where the number of rows in grid II is equal to the number of rows in grid Step 2520: Define an "allowed (tolerable) error", e.g. the difference between the pixels in grid II to the pixels in grid III, e.g. typically a numerical value in the order of magnitude of 50[micro-meter] dependent on projection parameters such as but not limited to some or all of: resolution, distance from mirror to screen, size of projected image.

Step 2530: Define an index k running from 1 to the number of elements per row of grid II: k=1:1:length_row(grid II)

Step 2540: For each of the lines in grid III (index i) do step 2550.
Step 2550: For each of the pixels along the line in grid III (index j), do steps 2560 - 2580.

2560: Compute the distance between pixel(i,j) in grid III and pixel(i,k) in grid II 2570: Compare the distance computed in step 2560 to the allowed error defined in step 2575. IF distance <= error, return time-stamp information e.g. for the pixel(i,k) in grid II
If distance > error, check next pixel (k=k+1).

2580: Return the time-stamp information, which is typically a matrix whose dimensions equal those of grid III.

Fig. 26

| 910: | Generate start_p (starting point) matrix: for each of the pixels to be projected, compute the point in time at which the laser is to be turned on, e.g.: from element $t_{i,j}$ in grid IV generated in step 50 in fig. 1b, subtract half of pixel duration matrix element $d_{i,j}$ generated in step 55 of Fig. 1b<br><br>Example: $(\text{start}\_p)_{i,j} = t_{i,j} - \frac{1}{2}d_{i,j}$ |
|---|---|
| 920: | Generate end_p (ending point) matrix: for each of the pixels to be projected, compute point in time at which the laser is to be turned on, e.g.: to element $t_{i,j}$ in grid IV (generated in step 50 in fig. 1b) add half of pixel duration matrix element $d_{i,j}$ (from step 55 in fig. 1b).<br><br>Example: $(\text{end}\_p)_{i,j} = t_{i,j} + \frac{1}{2}d_{i,j}$ |
| 930 | Load $(\text{start}\_p)_{i,j}$ and $(\text{end}\_p)_{i,j}$ matrices generated in steps 910, 920, into the processor that controls the laser. |
| 940 | operate laser, using the two matrices uploaded in step 930 to modulate the laser |

SYSTEM AND METHOD FOR CORRECTING OPTICAL DISTORTIONS WHEN PROJECTING 2D IMAGES ONTO 2D SURFACES

REFERENCE TO CO-PENDING APPLICATIONS

Priority is claimed from:

U.S. provisional application No. 61/654,817, entitled "A method for projected image pixel and brightness uniformity" and filed 2 Jun. 2012; and PCT Application No. PCT/IL2012/050351 "Apparatus and methods for locking resonating frequency of a miniature system".

FIELD OF THIS DISCLOSURE

The present invention relates generally to projecting images and more particularly to use of lasers for projecting images.

BACKGROUND FOR THIS DISCLOSURE

Conventional technology constituting background to certain embodiments of the present invention is described in the following publications inter alia:

Smart glasses are known and are described e.g. on Google's website at google.com/glass/start/how-it-feels.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide an improved method for projecting images onto a surface, e.g. in a system for projecting 2D images represented by pixels onto a 2D surface, operative in conjunction with a laser which generates a coherent beam and is arranged to impinge upon a micro-mirror arranged for pivoting, at non-uniform angular velocity, about two axes, so as to reflect the coherent beam sequentially over the entirety of the 2D surface.

Certain embodiments of the present invention seek to reduce keystone and/or "pincushion" optical distortion effects in which straight lines are bowed towards the center point of a projected image.

Certain embodiments of the present invention seek to reduce optical distortion effects in which laser-generated light spots (pixels) are distributed non-uniformly rather than at equal intervals along the horizontal direction, due to sinusoidal angular motion of a pivoting mirror upon which the laser beam initially impinges.

Certain embodiments of the present invention seek to reduce artifactual effects of the uniformity and brightness of the projected image on the intensity level of the laser, at different pixels along the horizontal axis, causing the intensities of the pixels to be unequal rather than equal.

Certain embodiments of the present invention seek to provide an improved method for synchronizing mirror motion and laser operation e.g. to achieve at least one of the above objectives, e.g. in a system for projecting 2D images represented by pixels onto a 2D surface, operative in conjunction with a laser which generates a coherent beam and is arranged to impinge upon a micro-mirror arranged for pivoting, at non-uniform angular velocity, about two axes, so as to reflect the coherent beam sequentially over the entirety of the 2D surface.

Certain embodiments of the present invention seek to provide an improved laser operation method using a high speed clock for modulation of the laser, such that the light pulses that create the pixels are scattered at varying time intervals.

Certain embodiments of the present invention seek to provide an improved laser operation method in which different laser on-times, which compensate for the varying angular motion of the mirror, are used for different pixels.

The present invention typically includes at least the following embodiments:

Embodiment 1

A method for projecting 2D images represented by pixels onto a 2D surface, using at least one laser which generates at least one coherent beam and is arranged to impinge upon at least one micro-mirror arranged for pivoting, at non-uniform angular velocity, about two axes, so as to reflect the coherent beam sequentially over the entirety of said 2D surface, a. the method comprising:

b. providing a computerized representation of a first, dense, grid of spatial 3D coordinates comprising a multiplicity of angular orientations of the mirror given a specific predefined operating modulating frequency of the laser; where the spatial 3D coordinates in space respectively correspond to a set of time-points that are evenly distributed along a time-dimension with constant time-discretization deltaT;

c. deriving a dense 2D representation of an image, comprising a dense grid of first coordinate pairs, from said first, dense, grid of spatial 3D coordinates, where the coordinate pairs in said 2D representation respectively correspond to said set of time-points;

d. defining a computerized representation of a sparse 2D grid of second coordinate pairs, which is sparser than said dense 2D representation, wherein said second coordinate pairs are spaced such that distances between any two adjacent coordinate pairs along a row of said sparse 2D grid are constant; and e. finding, in said dense grid of first coordinate pairs, the subset of coordinate pairs that is closest to the second sparser grid of coordinate pairs, thereby to yield a third grid of 2D spatial coordinates characterized in that if a laser is used to project a digitally represented image onto a 2D surface, from a user-selected distance within the range of distances, and the laser operation is timed to project pixels whose locations respectively correspond to the subset of uniformly distanced positions forming said third grid, image distortion is prevented despite non-uniformity of said micro-mirror's angular velocity.

Embodiment 2

A method according to any of the preceding embodiments wherein said providing a first, dense, grid includes computing the micro-mirror's pivoting motion as a function of the laser's modulation frequency.

Embodiment 3

A method according to any of the preceding embodiments wherein said pre-selecting comprises generating, and said operating comprises receiving, data indicating points in time at which pixel centers are to be projected.

Embodiment 4

A method according to any of the preceding embodiments and wherein said operating also comprises receiving pixel-duration matrix data indicating an on-time (on-duration) for each pixel, which varies along each row to ensure equal intensity for all pixels in the row despite the varying angular velocity of the mirror.

Embodiment 5

A method according to any of the preceding embodiments wherein said pixel-duration matrix data is provided by computing pixels' intensities as a function of a time-dependent angular velocity of the micro-mirror.

Embodiment 6

A method according to any of the preceding embodiments and also comprising:
providing a desired pixel width value suited to a user-selected distance, from among a range of distances, from which it is desired to project 2D images onto the 2D surface, and computing a laser-on time for each pixel, based on (a) information regarding desired pixel center locations derived from said third grid of 2D spatial coordinates; and (b) said desired pixel width value.

Embodiment 7

A system for projecting 2D images represented by pixels onto a 2D surface, operative in conjunction with a laser which generates a coherent beam and is arranged to impinge upon a micro-mirror arranged for pivoting, at non-uniform angular velocity, about two axes, so as to reflect the coherent beam sequentially over the entirety of said 2D surface,
a. the system comprising:
a processor operative for:
b. providing a computerized representation of a first, dense, grid of spatial 3D coordinates comprising a multiplicity of angular orientations of the mirror given a specific predefined operating modulating frequency of the laser; where the spatial 3D coordinates in space respectively correspond to a set of time-points that are evenly distributed along a time-dimension with constant time-discretization deltaT;
c. deriving a dense 2D representation of an image, comprising a dense grid of first coordinate pairs, from said first, dense, grid of spatial 3D coordinates, where the coordinate pairs in said 2D representation respectively correspond to said set of time-points;
d. defining a computerized representation of a sparse 2D grid of second coordinate pairs, which is sparser than said dense 2D representation, wherein said second coordinate pairs are spaced such that distances between any two adjacent coordinate pairs along a row of said sparse 2D grid are constant; and
e. finding, in said dense grid of first coordinate pairs, the subset of coordinate pairs that is closest to the second sparser grid of coordinate pairs,
thereby to yield a third grid of 2D spatial coordinates,
and a laser controller operative to control the laser to project a digitally represented image onto a 2D surface, from said distance, the laser operation being timed to project pixels whose locations respectively correspond to the subset of uniformly distanced positions forming said third grid, thereby to prevent image distortion despite non-uniformity of said micro-mirror's angular velocity.

Embodiment 8

A method according to any of the preceding embodiments wherein said providing a computerized representation of a first, dense, grid comprises pre-computing the first, dense grid such that deltaT is fixed over all positions in the first grid, wherein said deriving comprises deriving said dense 2D representation such that deltaX is not fixed over all positions whereas deltaT is fixed over all positions and wherein said defining comprises defining a sparse 2D grid such that deltaX is fixed over all positions.

Embodiment 9

A method according to any of the preceding embodiments and wherein the laser is operated such that the laser's on-time for each individual pixel in a 2D image being projected, are determined by the pixel-duration matrix.

Embodiment 10

A method according to any of the preceding embodiments wherein said operating comprises:
turned on (activated) at a time preceding, by one-half of a desired pixel width value, a time-point represented by an element corresponding to said individual pixel, in the pixel-duration matrix,
turned-off (de-activated) at a time which is one-half of a desired pixel width value later than said time-point represented by said element corresponding to said individual pixel in the pixel-duration matrix.

Embodiment 11

A method according to any of the preceding embodiments and also comprising operating the laser to project a digitally represented image onto a 2D surface, from a user-selected distance within the range of distances, wherein laser operation is timed to project pixels whose locations correspond to the subset of uniformly distanced positions forming said third grid, thereby to prevent image distortion despite non-uniformity of said micro-mirror's angular velocity.

Embodiment 12

A method according to any of the preceding embodiments wherein defining comprises positioning said sparse 2D grid's rows and columns of second coordinate pairs such that adjacent rows and adjacent columns are each separated by a uniform distance comprising a target resolution value at which 2D images are to be projected on the 2D surface.

Embodiment 13

A system according to any of the preceding embodiments and also comprising a micro-mirror arranged for pivoting, at non-uniform angular velocity, about two axes, so as to reflect the coherent beam sequentially over the entirety of said surface.

Embodiment 14

A system according to any of the preceding embodiments and also comprising a laser which generates a coherent beam and is arranged to impinge upon the micro-mirror arranged for pivoting.

Embodiment 15

A system according to any of the preceding embodiments installed in a mobile, carryable device compact enough for a human to carry.

Embodiment 16

A system according to any of the preceding embodiments wherein said mobile, carryable device comprises at least one of: a hand-held device, a screen-less device, a cell phone, a personal digital assistant, a smart phone, a laptop, an iPad, a tablet, smart glasses, a gaming device, a head Up Display (HUD), and a Head Mounted Display (HMD).

Embodiment 17

A system according to any of the preceding embodiments and also comprising a micro-mirror arranged for pivoting, at non-uniform angular velocity, about two axes, so as to reflect the coherent beam sequentially over the entirety of said 2D surface.

Embodiment 18

A system according to any of the preceding embodiments and also comprising an interface operative to provide a distance from said micro-mirror to said 2D surface.

Embodiment 19

A method according to any of the preceding embodiments wherein said providing a computerized representation of a first, dense, grid comprises at least one of:
 using a processor for computing said first, dense, grid; and
 storing a computerized representation of said first, dense, grid in computer storage.

For example, the laser operation may be timed to project pixels whose centers' locations respectively correspond to the subset of uniformly distanced positions forming said third grid, image distortion is prevented despite non-uniformity of said micro-mirror's angular velocity.

deltaT or "dt" is a constant which is the multiplicative inverse of the laser modulation frequency (i.e. 1/laser modulation frequency). deltaX as used below is a value (which may not be constant) representing the horizontal distance between pixels, across a wall or other surface onto which an image is being projected. The target value for deltaX is typically determined from a pre-determined resolution promised to customers.

It is appreciated that the dense 2D grid (grid II) is derived from the dense 3D grid (grid I), so both have constant dt, but varying deltaX. Sparse 2D grid (grid III) does not depend on time, hence has no deltaT. The deltaT arises in grid IV which is derived by comparing the "virtual" sparse 2D grid (grid III) and dense 2D grid (grid II). Generally, the grids described herein are virtual grids useful for understanding of certain embodiments of the invention and/or for actual computation and/or computer storage.

Also provided, excluding signals, is a computer program comprising computer program code means for performing any of the methods shown and described herein when said program is run on a computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium. The term "non-transitory" is used herein to exclude transitory, propagating signals, but to otherwise include any volatile or non-volatile computer memory technology suitable to the application.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

BRIEF DESCRIPTION OF THE DRAWINGS

Certain embodiments of the present invention are illustrated in the following drawings:

FIGS. 1a-1b, taken together, form a simplified flowchart illustration of a Laser Synchronization method for achieving a rectangular projected image which does not suffer from pincushion and dynamic distortions.

FIG. 2 is a simplified flowchart illustration of a method for performing the mirror defection characterization step 10 of FIG. 1a.

FIGS. 3, 4 are simplified flowchart illustrations of methods for performing steps 210, 230 of FIG. 2 respectively.

FIG. 5 is a simplified flowchart illustration of a method for performing 'screen-reflected laser beam' intersection computation step 30 of FIGS. 1a-1b.

FIG. 6 is a simplified flowchart illustration of a method for performing sparse (also termed "rough") grid generation step 40 of FIGS. 1a-1b.

FIG. 7 is a simplified flowchart illustration of a method for performing step 660 of FIG. 6.

FIG. 21 is a table which lists projection parameters that may determine both the horizontal and vertical Fields of View. Generally, each table herein may include only a subset of the rows and columns shown herein.

FIG. 22 is a table which presents parameters which define the angular motion of the mirror and typically affect laser synchronization.

FIG. 24a represents one row of an example grid II derived in step 30 in which points are less crowded near the edges of each row and become crowded toward the middle of each row.

FIG. 24b is a diagram helpful in understanding generation of a fourth grid, grid IV, that lies on the same 2D plane as Grid II.

FIG. 24c shows the grid of FIG. 24b superimposed onto Grid II generated in step 30.

The table of FIG. 24d illustrates (first line) the points in Grid II which are closest to each of the points in Grid IV (second line).

FIG. 25 is a simplified flowchart illustration of an example method for performing step 50 of FIG. 1b.

FIG. 26 is a simplified flowchart illustration of an example method for performing step 60 of FIG. 1b by generating and uploading $(start\_p)_{i,j}$ and $(ending\_p)_{i,j}$ according to which the electrical circuit connected to the laser may turn the laser on and off respectively.

Figure 27:
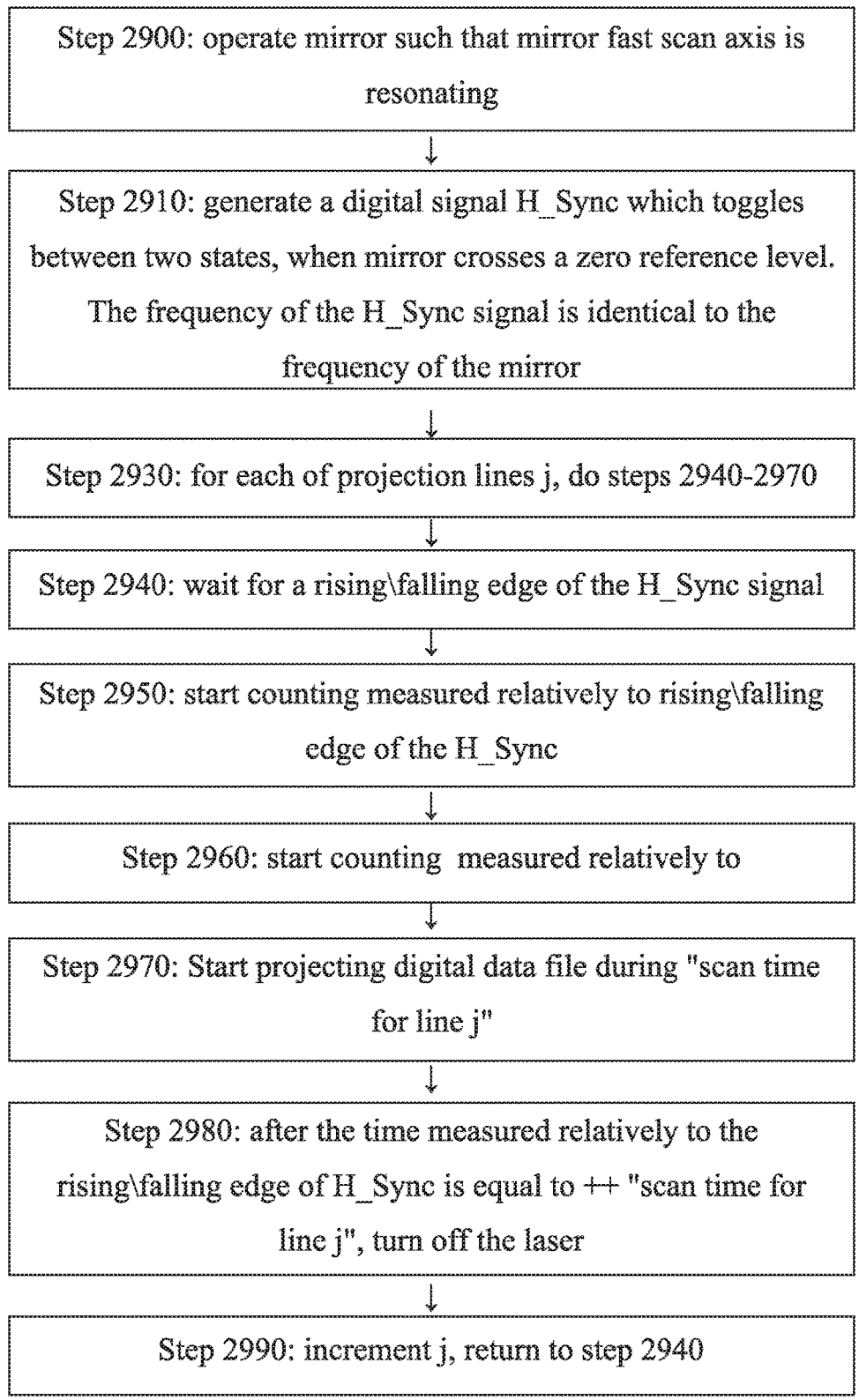

FIG. 27 is a simplified flowchart illustration of a method for determining a time at which to start projection of an individual row j of an image to be projected.

Figure 28:
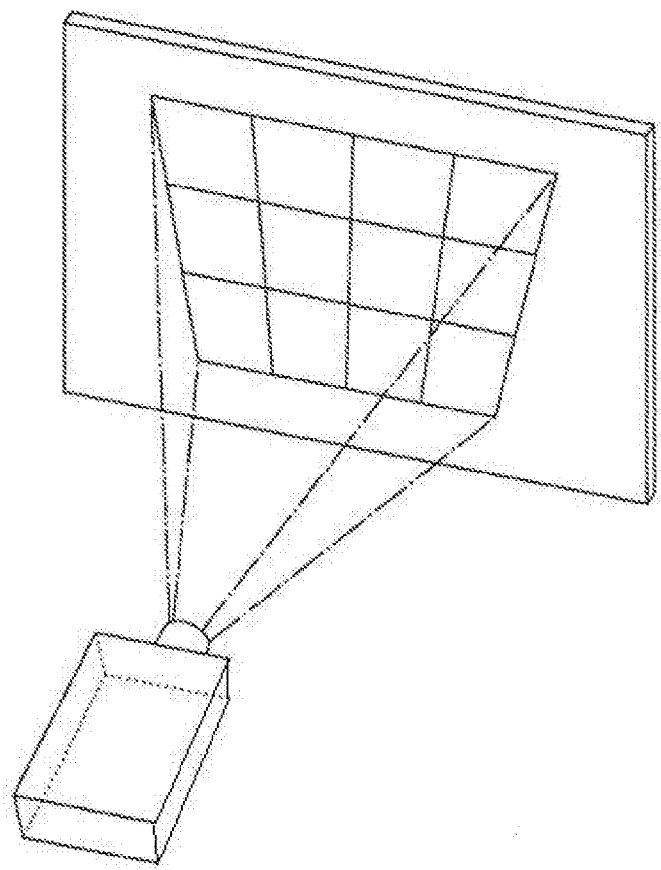

FIG. 28 is a prior-art schematic sketch of a projector, facing upward to a screen and yielding undesirable keystone distortion.

Data can be stored on one or more tangible or intangible computer readable media stored at one or more different locations, different network nodes or different storage devices at a single node or location.

DETAILED DESCRIPTION OF CERTAIN EMBODIMENTS

A method and a system, e.g. as per the drawings, is provided for projecting 2D images represented by pixels onto a 2D surface, using at least one laser which generates at least one coherent beam and is arranged to impinge upon at least one micro-mirror arranged for pivoting, at non-uniform angular velocity, about two axes, so as to reflect the coherent beam sequentially over the entirety of said 2D surface, the method comprising:

providing a computerized representation of a first, dense, grid of spatial 3D coordinates comprising a multiplicity of angular orientations of the mirror given a specific predefined operating modulating frequency of the laser; where the spatial 3D coordinates in space respectively correspond to a set of time-points that are evenly distributed along a time-dimension with constant time-discretization deltaT e.g. as per FIG. 1a, step 20 described below.

deriving a dense 2D representation of an image, comprising a dense grid of first coordinate pairs, from said first, dense, grid of spatial 3D coordinates, where the coordinate pairs in said 2D representation respectively correspond to said set of time-points, e.g. as per FIG. 1a, step 30 described below.

Defining a computerized representation of a sparse 2D grid of second coordinate pairs, which is sparser than said dense 2D representation, wherein said second coordinate pairs are spaced such that distances between any two adjacent coordinate pairs along a row of said sparse 2D grid are constant, e.g. as per FIG. 1b, step 40 described below.

Finding, in said dense grid of first coordinate pairs, the subset of coordinate pairs that is closest to the second sparser grid of coordinate pairs, e.g. as per FIG. 1b, step 50 described below, thereby to yield a third grid of 2D spatial coordinates characterized in that if a laser is used to project a digitally represented image onto a 2D surface, from a user-selected distance within the range of distances, and the laser operation is timed to project pixels whose locations respectively correspond to the subset of uniformly distanced positions forming said third grid, image distortion is prevented despite non-uniformity of said micro-mirror's angular velocity.

FIGS. 1a-1b, taken together, form a simplified flowchart illustration of a Laser Synchronization method for achieving a rectangular projected image which does not suffer from optical distortions such as pincushion or keystone distortions, e.g. as per the above embodiment.

The method of FIGS. 1a-1b typically comprises some or all of the following steps, suitably ordered e.g. as shown:

Step 5: provide laser projecting beam onto mirror and screen onto which the coherent light reflected from the mirror impinges. Mirror typically pivots about 2 axes with angular deflection typically time-dependent along fast scan axis & constant along the slow scan axis.

The fast scan axis and slow scan axis are denoted, in various examples herein x, y axes respectively.

Step 10: use processor to (typically analytically) characterize mirror's angular deflection along each of the x, y axes e.g. as per FIG. 2, using time discretization, defined by the laser modulation frequency, to describe the mirror's angular deflection along the fast scan axis and discretization of space to describe the mirror's angular deflection along the slow scan axis). Use this info to compute Virtual 3d Body=total volume of light reflected from the mirror as the laser beam impinges on the mirror and the mirror pivots along both axes.

Figure 8:
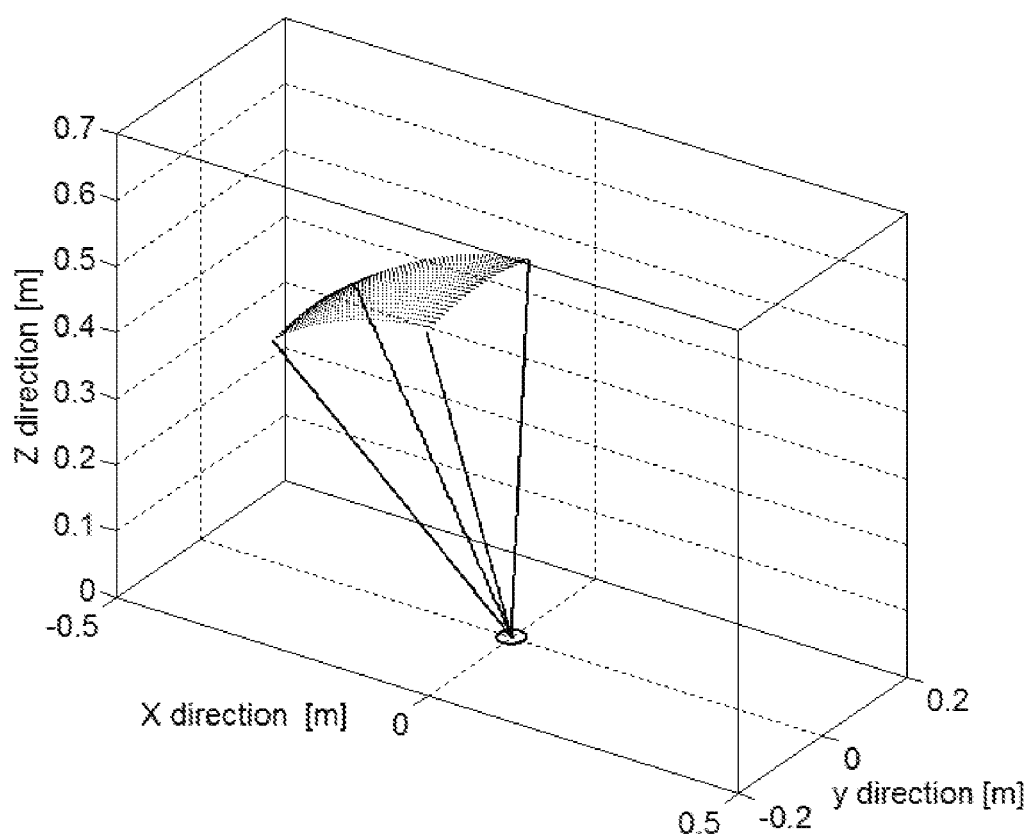
FIG. 8 illustrates a geometric structure useful in understanding computation step 15 in the method of FIGS. 1a-1b.

Step 15: use processor to compute portion of Virtual 3d Body's surface area bounded by making 4 virtual planar slices in the Virtual 3d Body, where the 4 slices intersect at a single point which is the center of the mirror's reflective surface. This portion, termed herein a "spherical wedge intersection", comprises, according to certain embodiments, e.g. as shown in FIG. 8, a 3D body which is the intersection between:

a. a first portion or "slice" of a sphere lying between two planes formed by pivoting an y-z plane around the x axis, passing through the center of the sphere, and generating a 1$^{st}$ angle therebetween, and b. a second portion or "slice" of the sphere lying between two planes formed by pivoting an x-z plane around the y axis, passing through the center of the sphere and generating a 2$^{nd}$ angle therebetween.

The sphere has a radius 'r' and is defined by the coherent light projected from the mirror with a constant radius r.

The spherical wedge intersection comprises, according to certain embodiments, a "partial spherical wedge" consisting of a portion of a ball bounded by four planes that intersect with the ball diameter, such that the sectors formed by each two opposing (i.e. non-adjacent) planes, are identical. The two angles between the radii lying within the bounding planes are the dihedral angles of the partial wedge α, β. It is appreciated that the term "spherical wedge" refers to a volume of a sphere lying between two vertical (say) planes passing through the center of the sphere.

Generally, it is appreciated that a coherent light beam which impinges on hence is reflected from a mirror pivoting about its two axes generates a virtual 3D body. The light beam reflected from the pivoting mirror surface creates a spherical 3D body which may comprise a pyramid whose base is a spherical surface. The vertex of this 3D body is the mirror's center, and the surface is spherical due to the constant radius of the light beam projected from the mirror.

Step 20: use processor to define dense grid of points (each having x, y, z coordinates in space) covering most or all of Virtual 3d Body's surface area portion computed in step 15. Points in the dense grid represent angular deflections occurring along the fast and slow scan axes over a sequence of predetermined fixed time intervals.

While a search algorithm-based process may be employed, as described in detail hereinbelow, according to one embodiment, the distance between successive grid points along the fast scan axis on the dense grid is determined analytically e.g. by the following formula, which relates to the middle line of the projected surface:

$$dX_{grid,j} = dt \frac{d_s}{\cos^2(\alpha_L + \theta^{O_{p,x}}(t))} \left(-\omega_n \theta_{peak}^{O_{p,x}} \sin(\omega_n t)\right) \quad \text{(formula A)}$$

Where, generally, and/or as defined below in the tables of FIGS. 21-22, dt is the time interval defined by the laser modulation frequency, $d_s$ is the distance between the mirror's center and the screen, $\alpha_L$ is the laser impinging angle towards the mirror center, $\theta^{O_{p,x}}(t)$ is the angular optical angle of the mirror along the fast scan axis, $\omega_n = 2\pi f$ [rad\sec] is the resonance frequency of the mirror in the fast scan axis, and $\theta_{peak}^{O_{p,x}}$ is the amplitude of the optical angle along the fast scan axis.

The distance between the slow scan axis lines is typically:

$$dY_{grid} = \frac{2d_s}{(N_v - 1)} \tan\theta_{peak}^{O_{p,y}} \quad \text{(formula B)}$$

Where $N_v$ is the number of pixels (slow scan resolution) and $\theta_{peak}^{O_{p,y}}$ is the amplitude of the optical angle along the slow scan axis.

Figure 9:
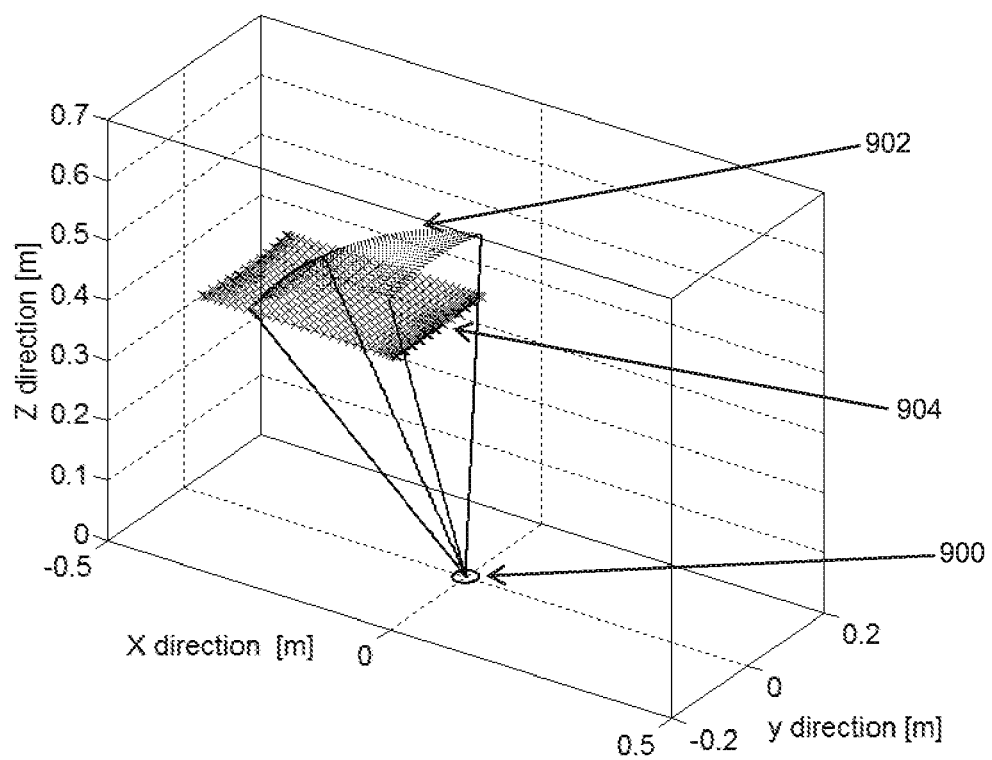
FIG. 9 illustrates geometric structure useful in understanding computation step 30 in the method of FIGS. 1a-1b.

Example numerical values for the distance between the pixels on the screen (assuming ~0.55 [m] distance between the mirror center and the screen):
$dX_{grid} \approx 420$ μm
$dY_{grid} \approx 450$ μm Store time-stamp corresponding to each point typically, the 1st corner-point of grid represents the x, y angular deflection of mirror at time t=0. To proceed, define range of angular deflection for each of the coordinates, where the subscripts x and y relate to the fast and slow scan axis directions, respectively:

$-(\overline{\theta}_x) < \theta_x < +(\overline{\theta}_x)$ $-(\overline{\theta}_y) < \theta_y < +(\overline{\theta}_y)$ The range of the angular deflection defines the vertices of the grid, e.g.:
Point A corresponds to the set of $\{-(\overline{\theta}_x), -(\overline{\theta}_y)\}$
Point B corresponds to the set of $\{-(\overline{\theta}_x), +(\overline{\theta}_y)\}$
Point C corresponds to the set of $\{+(\overline{\theta}_x), -(\overline{\theta}_y)\}$
Point D corresponds to the set of $\{+(\overline{\theta}_x), +(\overline{\theta}_y)\}$ Step 30: use processor to compute intersection (e.g. as illustrated in FIG. 9) between a plane, and the portion of the Virtual 3d Body bounded by (a) the surface area portion computed in step 15 and (b) said single point. So, step 30 pertains to an intersection of a plane (representing the screen) with an 3D body which describes the volume of light that is projected from the mirror.

The plane is typically but not necessarily the x-y plane which may have any suitable numerical value for its z coordinate. One example value is: z=0.55 [m], but this may be regarded as arbitrary.

Figure 10:
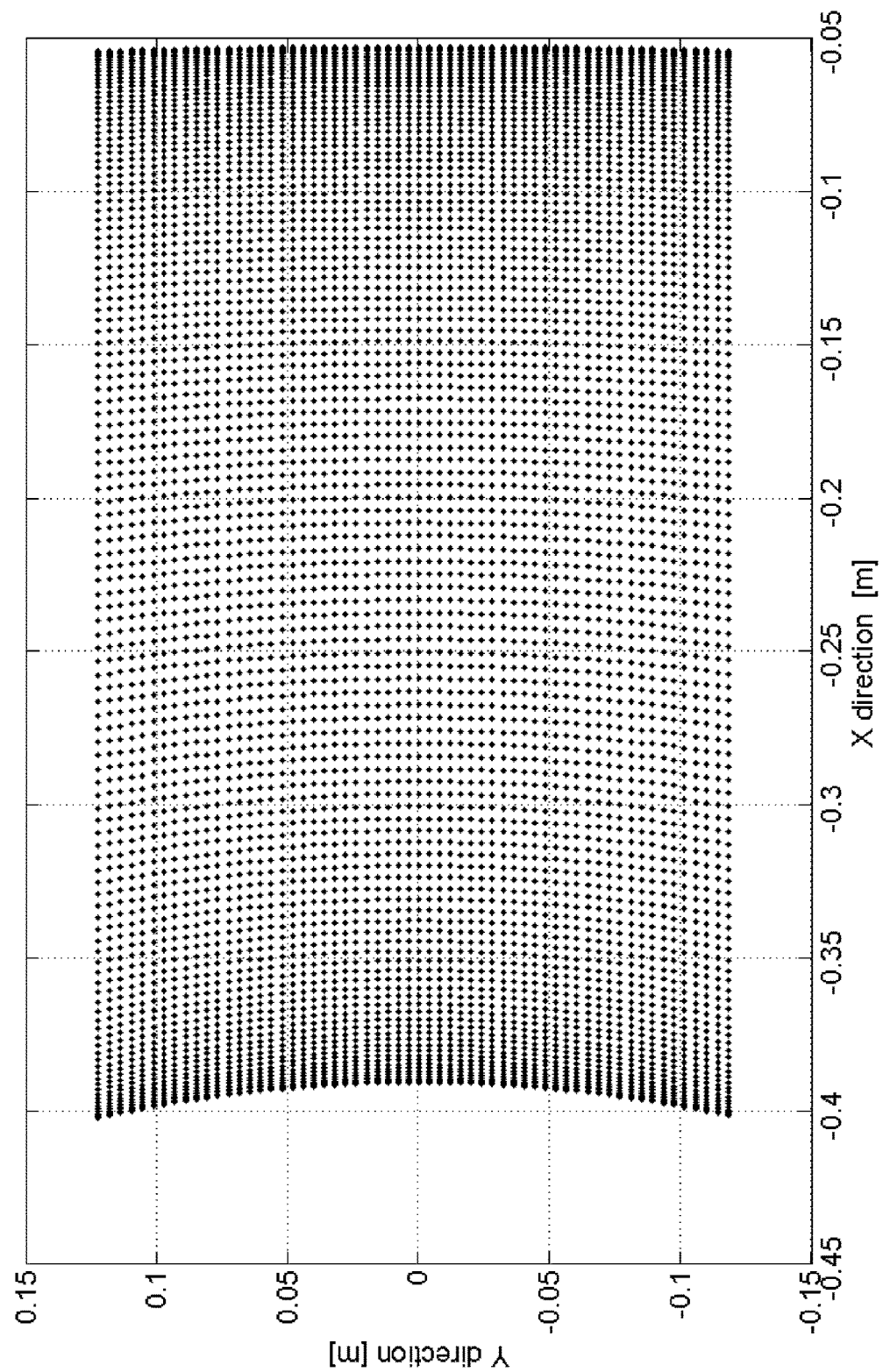
FIG. 10 illustrates a projected image (simulation result), e.g. of the system of FIG. 11; a pincushion distortion is visible at the left edge of the image.

A top view of an example resulting planar portion is illustrated in FIG. 10 and is seen to have two outward protrusions also termed herein convexities.

Step 40: use processor to define a sparse grid of points (each having x, y coordinates) covering most or all (say 90-95%) of intersection computed in step 30 (e.g. define rectangle, e.g. circumscribed rectangle, within the intersection and define sparse grid of coordinates covering that rectangle). Preferably, step 40 is performed in real time not as a pre-processing procedure, so distance between coordinates can be determined depending on distance between mirror and screen, or, perform during pre-processing, assuming a reasonable distance (e.g. in range of 20-120 cm) between mirror and screen. The distance between the coordinates may be defined by the horizontal and the vertical resolution of the projector and the distance from the mirror to the screen. For example, for conventional SVGA resolution (600×800 pixels) the distance may be ~450 [micro-m] and ~420[micro-m] between the vertical and horizontal pixels, respectively.

Step 50: for each sparse grid point, identify the closest point thereto in the dense grid and retrieve time-stamp of the closest point, thereby to generate a matrix of time-stamps also termed herein the "clock matrix" or "time-stamp matrix". It is appreciated that the distance between the mirror and the screen may change the location of the points on the sparse grid. For example, if the mirror is close to the screen, the projected area may be smaller (due to the small z coordinate) relative to the relatively large distance between mirror and screen.

In step 55, the pixel duration matrix, also termed herein "pixel duration file data", stores the respective on-times of the laser, while projecting each respective pixel. Each element in the matrix defines how long the laser is to be on according to the location of the specific pixel. As described herein, the laser is typically operated (step 60) such that the laser's on-times for each of the pixels in a 2D image being projected, are determined by the pixel-duration matrix.

According to certain embodiments, the pixel-duration matrix is a constant (all values are identical, such that the matrix is reduced to a single value and all pixels are given the same amount of on-time of the laser. To determine an appropriate single value, one may use an initial value based on the laser modulation frequency times a constant. For example, if the minimal frequency is say, 100 MHz, dt=1/100 MHz=10[nano-sec], one may start with an on-time of say, 2*dt, or 3*dt or more generally N*dt for any integer N.

Or, divide the image into (say) 3 (or 5 or 7 or more) regions, such as left, middle, and right regions; or such as far left, intermediate left, middle, intermediate right and far right regions. Define a specific parameter for each one of these regions. For example, suppose there are 900 pixels in each row. Pixels 1-300 may have an on-time whose value is time_duration_1, pixels 301-600 may have an on-time whose value is time_duration_2, and pixels 601-900 may have an on-time whose value is time_duration_3, and as above, time_duration_1 may be, say, 5*dt, time_duration_2 may be, say, 3*dt, and time_duration_3 may be, say, 5*dt where the constant are selected to ensure equal intensity on the basis of visual inspection. Another more complex option, if accuracy is required, is to analytically determine an appropriate on-time value, based on the kinematics of the mirror and suitable assumptions e.g. those detailed herein.

Figure 19:
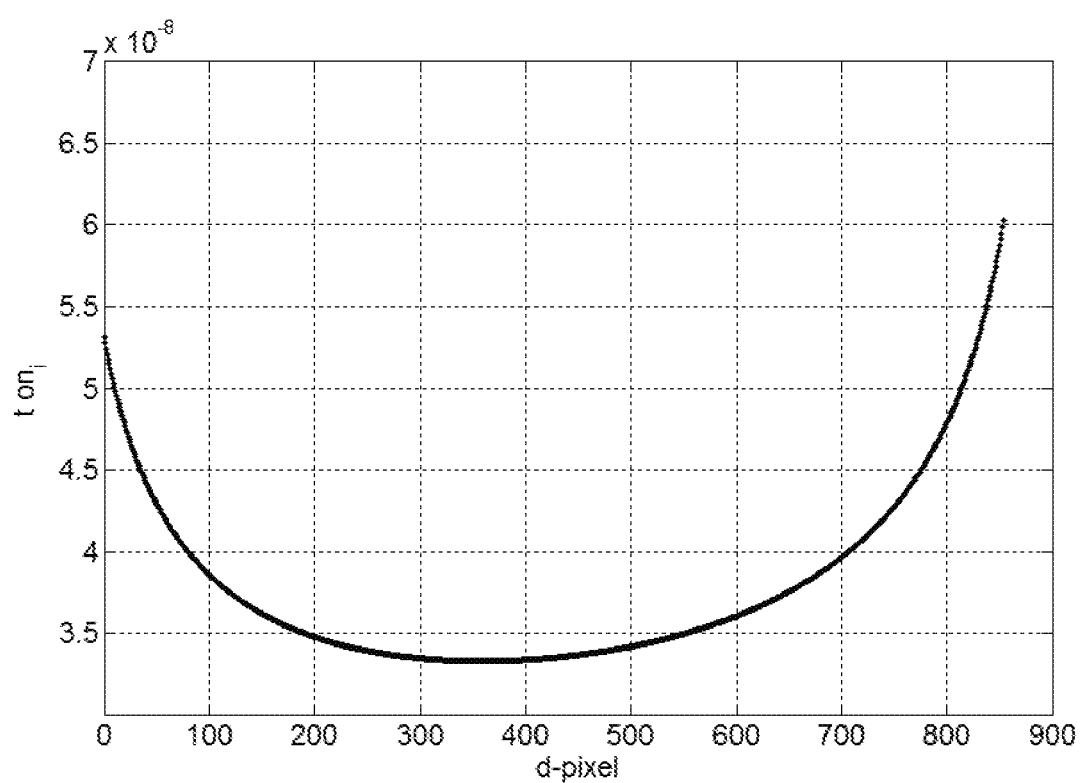
FIG. 19 illustrates computation of laser on time from Equation (17).

A method for computing pixels' intensities to be achieved as a function of a time-dependent angular velocity of the micro-mirror (t_on_i is different for each pixel) is described herein with reference to FIG. 19. It is appreciated that "Intensity" refers to power transferred per unit area where "power" (of the laser) is determined by the laser's energy divided by the time interval over which the laser is active. So, for constant laser energy level, (i.e. energy is on/off but cannot be modulated), laser power is controlled by defining different 'on times' for each pixel. Regarding laser intensity and uniformity of the projected image, assume that Laser Energy (power) is constant and define:

$t\_on_i$ is the 'on' time of laser for each pixel $x\_on_i$ is the diameter of each pixel $t_i$ is the time-stamp information for each pixel, derived in step 50 of FIG. 1b

Generally, uniformity of the image may be determined from the intensity of the laser where laser intensity is defined as the ratio between the power of the laser and the light-spot area. Assuming a circular light-spot, the laser intensity may be computed as:

$$Intensity_i = \frac{Power_i}{Area_i} = \frac{Laser\_Energy/t\_on_i}{\pi(x\_on_i)^2/4} \quad \text{(formula C)}$$

Pixel velocity may be computed as:

$$v_{p,i} = \frac{pixel\_size}{t_i} \quad \text{(formula D)}$$

The pixel diameter (in terms of the equal pixel size):

$$x\_on_i = v_{p,i} \cdot t\_on_i = \frac{pixel\_size \cdot t\_on_i}{t_i} \quad \text{(formula E)}$$

Substitution of $x\_on_i$ into the intensity expression yields:

$$Intensity_i = \frac{4 \cdot Laser\_Energy \cdot t_i^2}{\pi \cdot t\_on_i^3 \cdot pixel\_size^2} = C_1 \frac{t_i^2}{t\_on_i^3} \quad \text{(formula F)}$$

The intensity of the min. point is obtained by using $t\_on_i = \min(t_i)$

So, equal intensity of the pixels is obtained at:

$$t\_on_i = \sqrt[3]{t_i^2 \cdot \min(t_i)} \quad \text{(formula G)}$$

Time information may be presented in terms of laser-clocks. the starting point of the on-time is computed as (time to pixel-center matrix)_ij–(half-width).

The turning off point (laser-off) may be computed as follows:

(time to pixel-center matrix)_ij+ (half-width)

Step 60: operate laser, using the time-stamp information generated in step 50 to modulate the laser. Typically, operating the laser includes projecting an input digital file representing an image, onto the desired surface, from a user-selected distance. According to certain embodiments, the pixel matrix representing the image has pixel centers which correspond to the uniformly distanced positions represented by the nodes of the sparse grid, thereby to prevent image distortion despite non-uniformity of the micro-mirror's angular velocity.

Typically, the laser has a modulation-frequency parameter limiting how fast the laser can be turned on and off and the modulation-frequency parameter is used to build the time vector t. If this is the case, the time-stamp matrix generated in step 50 includes the temporal locations of pixels that may be evenly distributed on the surface e.g. wall, if laser activation of each pixel is timed according to the corresponding respective clocks in the time-stamp matrix. "Laser time-on" is a parameter that defines how long the laser may be kept 'on' for each pixel. This parameter is a constant if it is desired for the laser to be 'on' for the same amount of time for each one of the pixels in the screen or FOV. "Laser time-on" may also be pixel-specific, which allows a different time 'on' for each one of the pixels.

According to certain embodiments, the clock matrix defines the general temporal location of the pixels rather than the "begin-time" at which the laser is to start projecting each pixel, because the desired pixel width may not be known while the clock matrix is being constructed. For example, the clock matrix may be generated during manufacture stage, whereas the desired pixel width may be varied to match the distance from the screen e.g. wall and may therefore be different for each and every use of the projector. Typically, the clock matrix defines the temporal location of the exact centers of the pixels which allows the exact begin-time to be computed easily in real time, as soon as the desired pixel width is known.

Example 1

If the clock matrix defines pixel center times, then if a longer 'on-time', say 4 clocks, is desired, for all pixels, define the beginning time and end-time for each pixel as:

Begin-time(pixel_j)=[matrix_clock(pixel_j)−½*laser_on_time]

End-time(pixel_j)=[matrix_clock(pixel_j)+½*laser_on_time]

Example 2

If the 'laser-on-time' is pixel dependent, a separate matrix in computer memory may be provided to store desired pixel-specific 'on-time' values. Begin and end times are then again easily computed in real time, as soon as the desired pixel width is known:

Begin-time(pixel_j)=[matrix_clock(pixel_j)−½*laser_on_time(pixel_j)]

End-time(pixel_j)=[matrix_clock(pixel_j)+½*laser_on_time(pixel_j)]

In step 60, the laser operator may for example prepare the hardware (electrical circuit, driver and processor) according to time-information data shown and described herein. Typically for example, a computerized interface allows the laser operator to upload such data to the electrical circuit (e.g. processor) connected to the laser which responsively turns the laser on and off, according to the uploaded data. Optionally the user may manually provide a distance D between the mirror and the screen (step 470) and all other steps are automatic once the laser is on.

Figure 13:
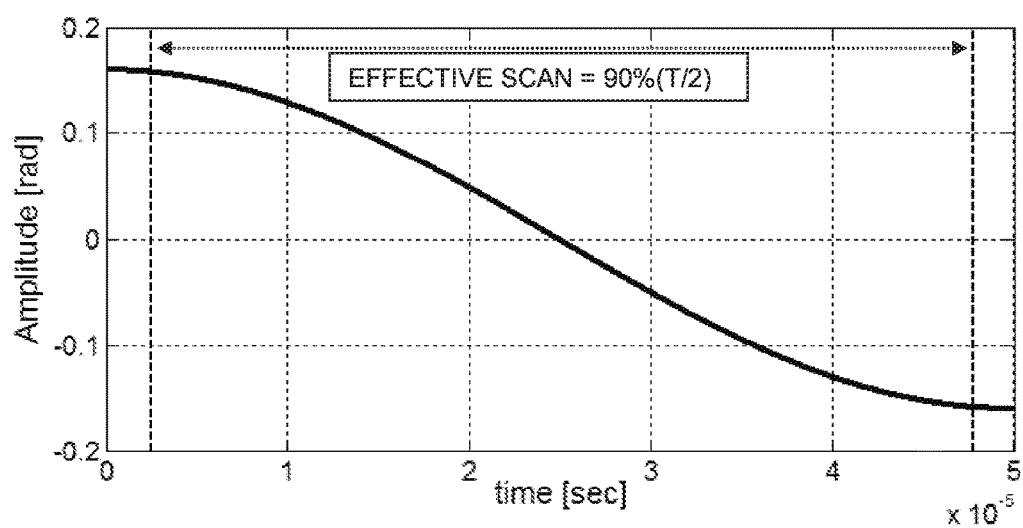
FIG. 13 illustrates a definition of the scan area.

Optionally, the system senses internal parameters which further facilitate laser control:

If the laser clock is to be synchronized to the location of the mirror, the mirror's location over time is needed as a parameter. FIG. 13 shows one half of the mirror's angular location vs. time. If a sinusoidal motion profile of the fast-scan axis of the mirror is assumed, then for a full period (T[sec]=1/f, f=resonance frequency [Hz] of the fast scan axis), the mirror rotates from one extreme location (maximal angular deflection) to a second extreme location, and then pivots back to its original location. Hence for one-half of a period (T/2), the mirror rotates from one extreme location to the other extreme location. This motion 'spans' one horizontal projected line on the screen. The digital data file that is sent to the laser is typically composed of data ordered by rows. Next, the first row is projected, and so forth. Projecting of one row occurs during one-half period of the scan axis of the mirror or less; typically, approximately 90% of the time of one-half of a period is used for projecting of a single horizontal line. In this case, then, the laser is typically synchronized to the location of the mirror.

A suitable method for synchronizing the laser's operation to mirror operation is now described with reference to FIG. 15 whose top graph shows the sinusoid motion of the mirror over 2.5 periods. The bottom graph depicts a digital signal, H_Sync, where H stands for "Horizontal motion". Typically, a suitable electronic system, connected to the mirror and comprising a micro-processor, an internal clock and associated electronic components, senses the motion of the mirror and generates a digital signal that toggles between two states (say 0 or 1). The H_Sync digital signal has a rising edge and a falling edge, which correspond to zero crossing of the mirror from one side to the other side.

Figure 15:
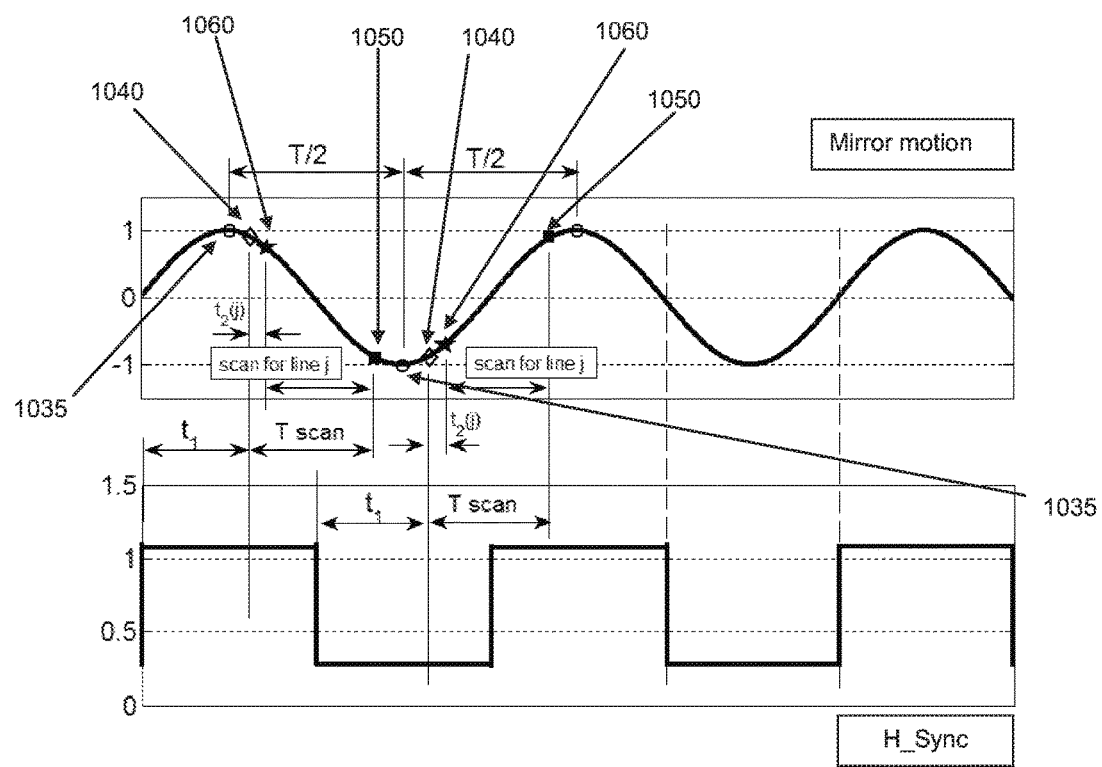
FIG. 15 is a schematic sketch of a H_Sync signal and mirror motion.

In the top graph of FIG. 15, the empty circular marker (1035) indicates the extreme location of the mirror (maximal angular deflection) on both sides. The time between any two circular markers is defined as T\2. Projection of the image is performed using, typically, less than T/2. Assuming that 90% (say) of the available time is utilized for data projection, then empty diamond (1040) depicts the beginning of the time to project a current row or line, and full square (1050) depicts the ending time for projecting the same row. Full star (1060) depicts a row-dependent parameter which defines a different starting projection for each row.

Synchronization between laser and mirror motion may be achieved based on parameters T_scan, $t_1$ and $t_2$ (j). Assume a rising edge of the H_Sync, which implies that the mirror changed its angular orientation from one side to the other side. Then $t_1$ is a measure in time from the rising edge of the H_Sync signal to the beginning of projection of the line.

Figure 20:
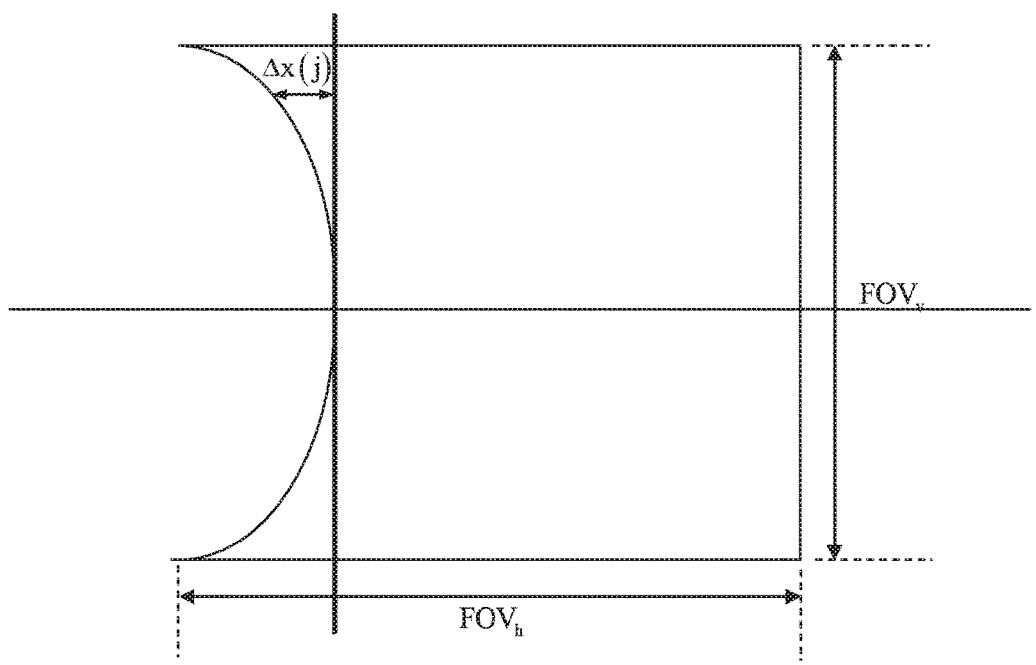
FIG. 20 illustrates a process of Definition of the Field of View before correction of pincushion distortion; the term "Field of view" refers to a portion of a surface such as a wall, onto which a pixel matrix representing a 2d image is projected.

FIG. 20 is a not-to-scale schematic image showing the left boundary of the image, before being corrected. The concave shape of the boundary indicates that trimming of the left boundary of the image is row-dependent. Each line is typically trimmed by a different amount. Typically, then, less than 90% of the time is used, for most rows, since the laser is not activated in regions that are not to be used.

Referring again to FIG. 15, the time $t_2(j)$ is different for each line, e.g. as defined herein. So, the actual duration of time during which data is projected ("scan time for line j") is different for each line or row; FIG. 27 is a simplified flowchart illustration of a self-explanatory method for defining the scan time for each row.

The H_Sync signal may be generated using a built-in MEMS capacitance sensor to sense the capacitance of the sensor vs. time. When the capacitance crosses a zero-reference level this state is identified and responsively, a rising or falling edge of the H_Sync is generated, e.g. as described in co-pending PCT Application No. PCT/IL2012/050351 "Apparatus and methods for locking resonating frequency of a miniature system" (published as WO 2013/030842 on 7 Mar. 2013).

FIG. 2 is a simplified flowchart illustration of a method for performing mirror defection characterization step 10 of FIGS. 1a-1b. The method of FIG. 2 typically comprises some or all of the illustrated steps, suitably ordered e.g. as shown.

FIGS. 3, 4 are simplified flowchart illustrations of method for performing steps 210, 230 of FIG. 2 respectively. The method of FIGS. 3, 4 each typically comprise some or all of the illustrated steps, suitably ordered e.g. as shown.

FIG. 5 is a simplified flowchart illustration of a method for performing 'screen-reflected laser beam' intersection computation step 30 of FIGS. 1a-1b. The method of FIG. 5 typically comprises some or all of the illustrated steps, suitably ordered e.g. as shown.

Regarding step 520, it is appreciated that if the 2D surface onto which the laser beam is being projected is not a plane, step 520 may be modified accordingly, typically depending on the geometric definition of the non-planar surface which may for example be expressed analytically. For instance, for a cylinder having its longitudinal axis as the z axis, define the surface as $$\frac{x^2}{a^2} + \frac{y^2}{b^2} = 1,$$

and continue from step 530.

FIG. 6 is a simplified flowchart illustration of a method for performing sparse grid generation step 40 of FIGS. 1a-1b. The method of FIG. 6 typically comprises some or all of the illustrated steps, suitably ordered e.g. as shown.

FIG. 7 is a simplified flowchart illustration of a method for performing step 660 of FIG. 6. The method of FIG. 7 typically comprises some or all of the illustrated steps, suitably ordered e.g. as shown.

A compact laser-mirror system for generating a rectangular projected image which does not suffer from optical distortions such as pincushion or keystone distortions is now described with reference to FIGS. 11-20. The system of FIGS. 11-20 may employ the synchronization method described with reference to any or all of FIGS. 1a-7.

When a scanning mirror is used in laser display systems, the kinematic properties of the mirror's motion affect the projected image. Consequently, certain corrections and system level integration actions may be useful, in isolation or in any suitable combination, in order to avoid image distortions and/or to achieve uniformity in terms of the brightness of the image.

FIG. 9 depicts a 3D view of a virtually projector system. The mirror 900 is located at the origin (x=0, y=0, z=0) of the coordinates system and projects light such that a 3D spherical surface 902 (black dense dots) is created. If a 2D screen is inserted in between the mirror position and the 3D spherical surface, the light beams are cut by the screen and an image is displayed, yielding 2D image 904 (black "x") on the screen.

Figure 11:
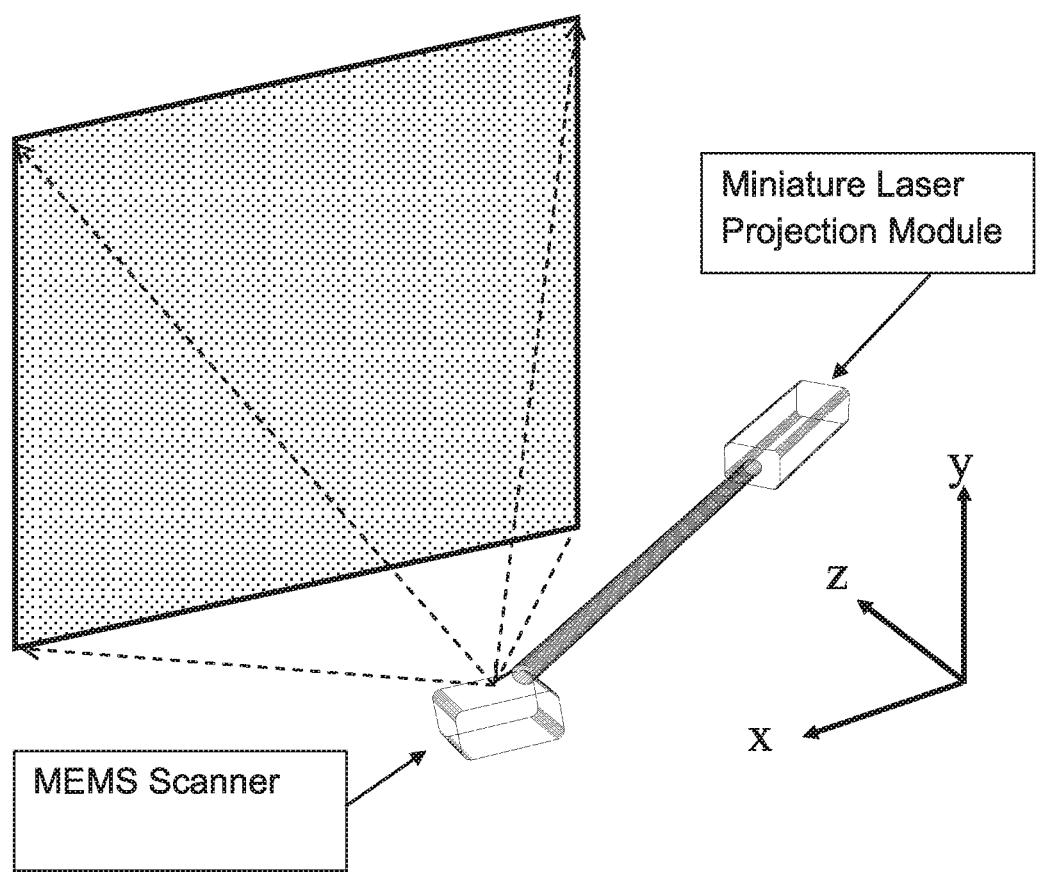
FIG. 11 illustrates a projection system constructed and operative in accordance with certain embodiments of the present invention.

FIG. 11 depicts a projection system constructed and operative according to certain embodiments. The system of FIG. 11 includes a MEMS scanner and a miniature laser projection modulus in which a laser beam is pointed at the MEMS scanner with an impinging angle which may be measured relative to the mirror's normal (z direction). This impinging angle causes an optical distortion, due to the asymmetric projection of the light.

When projecting a series of horizontal lines which have variable distance from the optical axis, an optical distortion, which is expressed by deviation from rectilinear projection along the edges, may result. This phenomenon is apparent when straight lines that do not go through the center of the image are bowed towards the center point of the image. FIG. 10 shows a pincushion distorted image using system parameters. FIG. 10 is a projected image (simulation result); a pincushion distortion is visible at its left edge.

Another optical distortion may be caused when projecting an image onto a surface at an angle such that the projector is not precisely centered with respect to the screen the projector is projecting on. This phenomenon, known as the keystone effect causes a projected rectangular image to appear trapezoidal, rather than rectangular. FIG. 28, a prior art drawing from U.S. Pat. No. 7,905,607 entitled "Projector and keystone distortion correction method for projector", is a schematic sketch of a projector facing upward to a screen, such that the image is larger on top than on the bottom.

Figure 23:
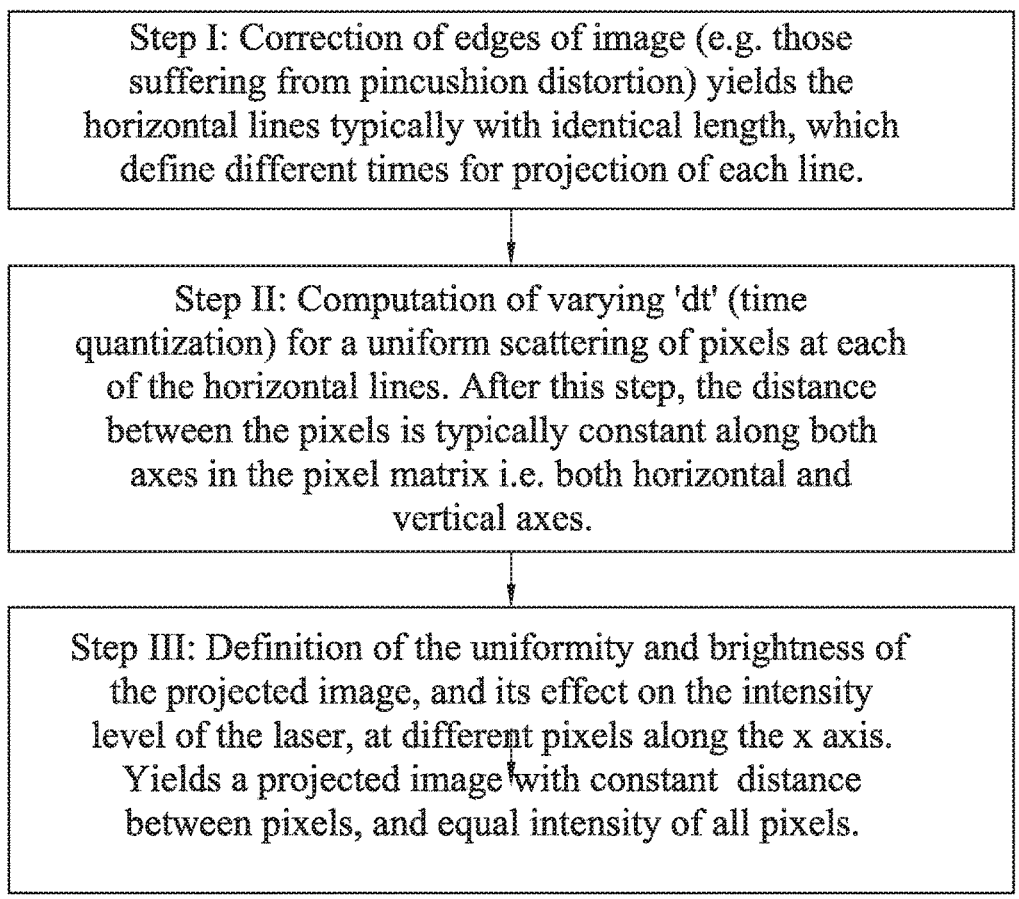
FIG. 23 is a simplified flowchart illustration of a method for image correction at system level.

One suitable method for image correction at system level is illustrated in FIG. 23 and may for example include some or all of the following steps, suitably ordered e.g. as follows:

Step I: Correction of the edges of the image (e.g. those that suffer from pincushion or keystone distortions). After this step, the horizontal lines typically have identical length, which defines different time for projection of each line.

Step II: Computation of varying 'dt' (time quantization) for a uniform scattering of pixels at each of the horizontal lines. This step may be performed due to the sinusoidal angular motion of the mirror in the horizontal direction. After this step, the distance between the pixels is typically constant along both axes in the pixel matrix i.e. both horizontal and vertical axes.

Step III: Definition of the uniformity and brightness of the projected image, and its effect on the intensity level of the laser, at different pixels along the x axis. After this step, the projected image is typically straight; the distance between the pixels is constant, and the intensity of each of the pixels is typically equal.

Correction of the image's edges e.g. as per Step I of FIG. 23 may be as follows:

Pincushion distortion and keystone distortion apparent in the left and right edges (FIGS. 10 and 28) may be corrected by trimming of the edges (i.e. turning off the laser) at the boundary of the image, such that the edges are perfectly parallel. Steps for correction of the image, to provide straight boundaries therefor, are then described below.

The scanning profile of the mirror in the horizontal direction is typically a sinusoidal profile, which dictates a time-dependent velocity of the mirror. Typically, the velocity of the mirror is maximal at the middle of the field, and is zero at the boundaries. In order to avoid projection of light at areas in which the velocity vanishes (due to eye safety regulations), an effective scan area of less than—say 90% of—the total period (FIG. 13) may be employed, e.g. by trimming the edges by 5% at each side.

Figure 12:
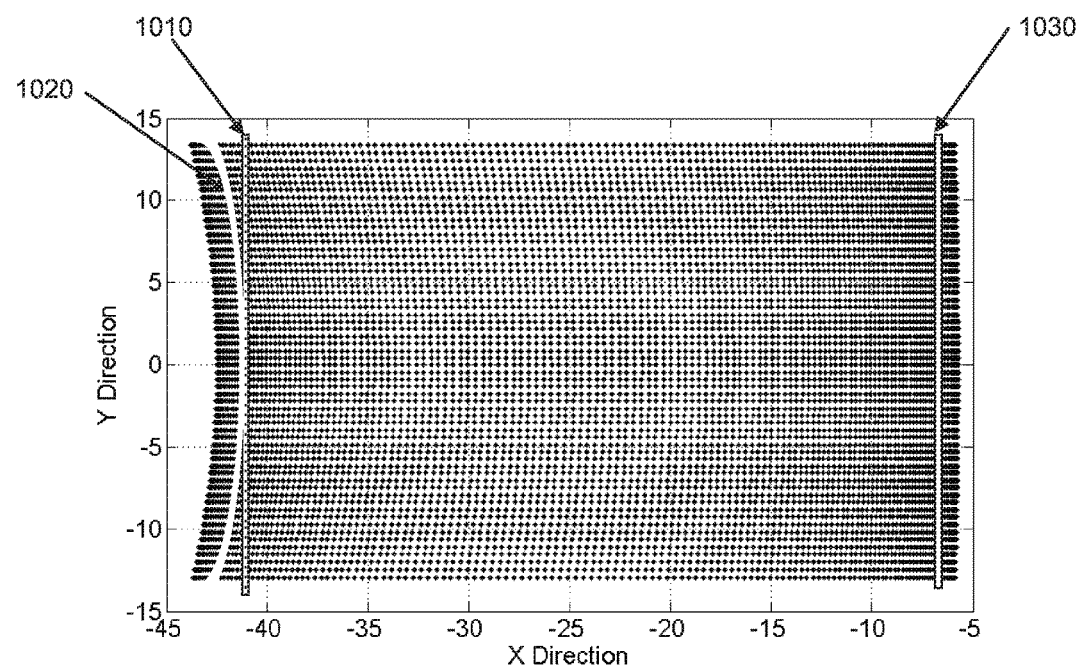
FIG. 12 illustrates the effective scan area of the projected image. The area bounded between the two white lines 1010, 1030 represents approximately 90% of the original projected area of the image.

FIG. 12 depicts the effective scan area in terms of the projected field. The two white solid lines 1010, 1030 correspond to the actual image size after trimming 5% off each side of the image.

After trimming 5% of the image on each side, pincushion and/or keystone distortions may be corrected by turning off the laser at times in which the mirror's motion yields projection of light beyond a pre-determined location in space. The black-dotted white vertical line 1010 in FIG. 12 corresponds to a new left boundary of the image obtained after turning off the laser at these locations.

FIG. 12 illustrates the effective scan area of the projected image. The two white solid lines 1020, 1030 represent the 90% effective area of the image. The black-dotted white vertical line 1025 in the left boundary represents correction of pincushion distortion. FIG. 12 illustrates the 90% scan area.

Figure 14A:
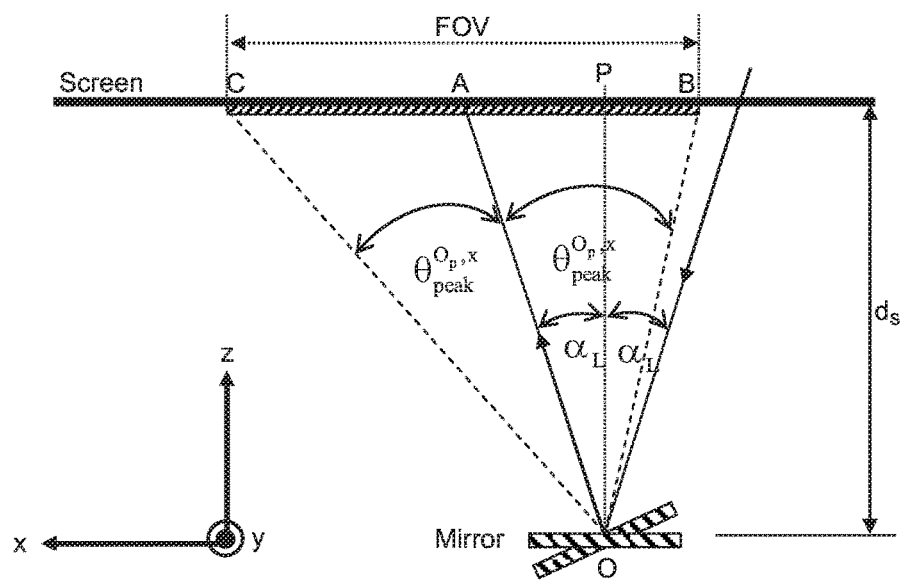
FIGS. 14a and 14b are schematic sketches of Fields of View (FOV) and their parameters.
Figure 14B:
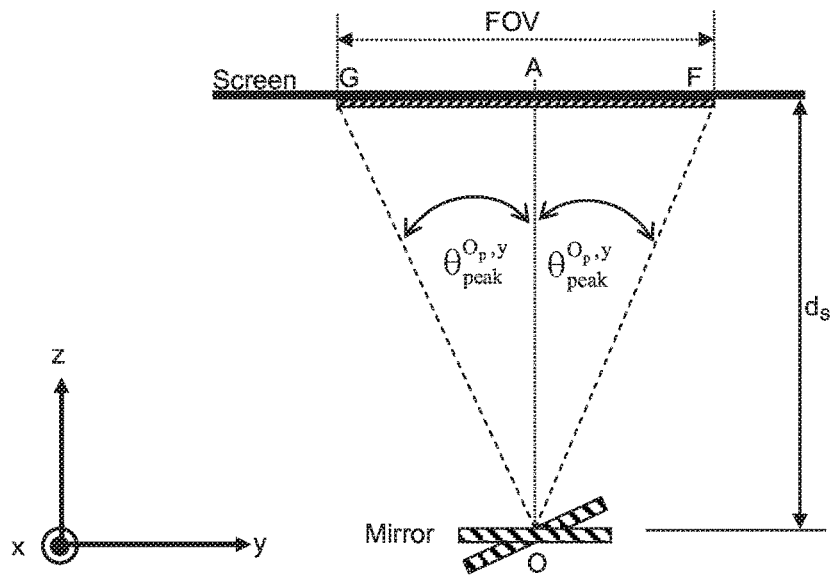

FIGS. 14a-14b are definition sketches illustrating parameters which may be used herein in the x-z and y-z planes, for the horizontal and the vertical field of views, respectively. The laser beam is typically parallel to the vertical axis in which case the vertical FOV is symmetric with respect to the z axis.

For clarity, define the mirror as the x-y plane, whereas the z direction points towards the screen. Point O represents the mirror center, point P is located along the z axis, and $d_S=OP$ defines the distance between the mirror and the screen along the z axis. The laser beam impinges upon the mirror at an angle $\alpha_L$. The screen is typically positioned parallel to the mirror when the mirror is at rest.

FIGS. 14a-14b are schematic sketches of the Fields of View (FOV) and their parameters for the Horizontal FOV and Vertical FOV respectively.

Also shown in FIGS. 14a-14b are the following geometric properties of the system:

Point A—The laser beam spot projected from the mirror when the mirror is at rest. Arrows leading to point A illustrate the incoming and exiting light beams, to and from the mirror at rest respectively. $\alpha_L$ (alpha_L) is the angle of impingement of the laser beam relative to the normal of the mirror plane e.g. in plane XZ Point B—The projected laser beam spot, when the mirror is at its maximal rotation angle to the right.

Point C—The projected laser beam spot, when the mirror is at its maximal rotation angle to the left.

The horizontal distance between the points B-C defines the horizontal field of view.

The table of FIG. 21, then, lists projection parameters, also termed herein "Scan parameters", that may determine both the horizontal and vertical Field of View.

A method for correction of the left edge of the image, according to certain embodiments, is now described. It is appreciated that the orientation of the laser with respect to the normal of the mirror defines the side of the image which is mainly affected by the pincushion. If the laser is rotated by 180 [deg], the projected side of the image that is mainly affected by the pincushion distortion is also rotated by 180 [deg].

The distortion on the left edge (FIG. 3) may be corrected by turning the laser off for areas located left of the vertical line. Before correction, the left boundary of the image has a hyperbole-like form, with a minimum at the center (y=0) of the image. This center-point determines the location of the corrected vertical boundary of the image. The vertical line drawn on the left edge of the image in FIG. 3 represents the new left boundary of the image. For correction of the pincushion distortion, first compute the time used for projection of each one of the horizontal lines. If the entire scan time is used for projection, the time for projection of the middle horizontal line is $\frac{1}{2}f_n$ (Equation 9). However, if only 90% of the motion is employed (FIG. 13), the time for projection of the middle line is $0.9/2f_n$. The signal H_Sync is synchronized according to the resonance of the mirror. The time to begin the projection is determined using a constant delay $t_1$ between the rising edge of the H_Sync signal and the beginning of the projection, e.g. as shown in FIG. 15 which is a schematic sketch of the H_Sync signal and the mirror motion.

The scan time (T Scan) marked between the empty diamond 1040 and the full square 1050 in FIG. 15 corresponds to the time, for the middle horizontal line, in which the motion of the mirror is used for projection. The laser is turned off when the mirror's motion is in the proximity of the mirror trajectory's extreme points. Except for a few horizontal lines located in the middle of the Horizontal FOV, for which the entire time T Scan is used, all the other horizontal lines are projected using a different scan time, which is calibrated according to an additional delay that reflects the time-off of the laser, for that line. For each of the other horizontal lines, define a different time delay $t_2$ (j) which is measured relatively to the $t_1$ time delay. This delay is indicated by a full star 1060 on the mirror motion's curve in FIG. 15. Time delay $t_2$ (j) typically imposes a shortened scan time for the rows j. Computation of the time delays $t_2$ (j) may be effected as described below with reference to FIG. 20.

Finally, the pincushion distortion may be corrected by generation of a table of time delays $t_2$ (j). The table may store the information for the time-off of the laser, for each horizontal line.

A method for Computation of a varying 'dt' (Step II of FIG. 23) is now described.

Corrections which yield equal distribution for the pixels in each horizontal line may be due to sinusoidal behavior of the mirror, which typically rotates with a time-dependent (i.e., not constant) velocity. Therefore, the velocity of the mirror in the center of the line differs from the mirror's velocity near the edges. In order to achieve evenly distributed pixels, the time for projection of each pixel (dt) is typically different (pixel-dependent, also termed herein "pixel-specific"). The variable dt, which is affected by the resolution required for an individual application, may be computed as described herein:

The table of FIG. 22 presents parameters, also termed herein "scan parameters", which define the angular motion of the mirror and affect laser synchronization.

The relationship between the mechanical angle of the axis ($\theta_{peak}^{M,x}$) and the optical angle of the projected line ($\theta_{peak}^{Op,x}$) may be described as Equation 1:

$$\theta_{peak}^{M,x} = \frac{1}{2}\theta_{peak}^{Op,x}$$

The optical angle $\theta_{peak}^{Op}$ is measured between the optical center and one edge of the projected line.

The location of each of the pixels along this line can be described by Equation 2:

$$X_{Pixel,j} = d_s \tan(\theta_j)$$

Where $\theta_j$ is the actual angle, measured from the mirror center, with respect to the vertical line PO (FIG. 14).

The angle $\theta_j = (\alpha_L + \theta_j^{Op,x})$ is bounded at the domain as per Equation 3:

$$\alpha_L - \theta_{peak}^{Op,x} \leq \theta_j \leq \alpha_L + \theta_{peak}^{Op,x}$$

Each horizontal line is created by a sequence of pixels, distributed at equal distances along the line.

Figure 16:
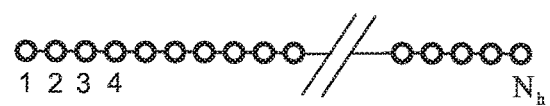
FIG. 16 is a schematic sketch of a horizontal line with equally spread pixels.
Figure 17:
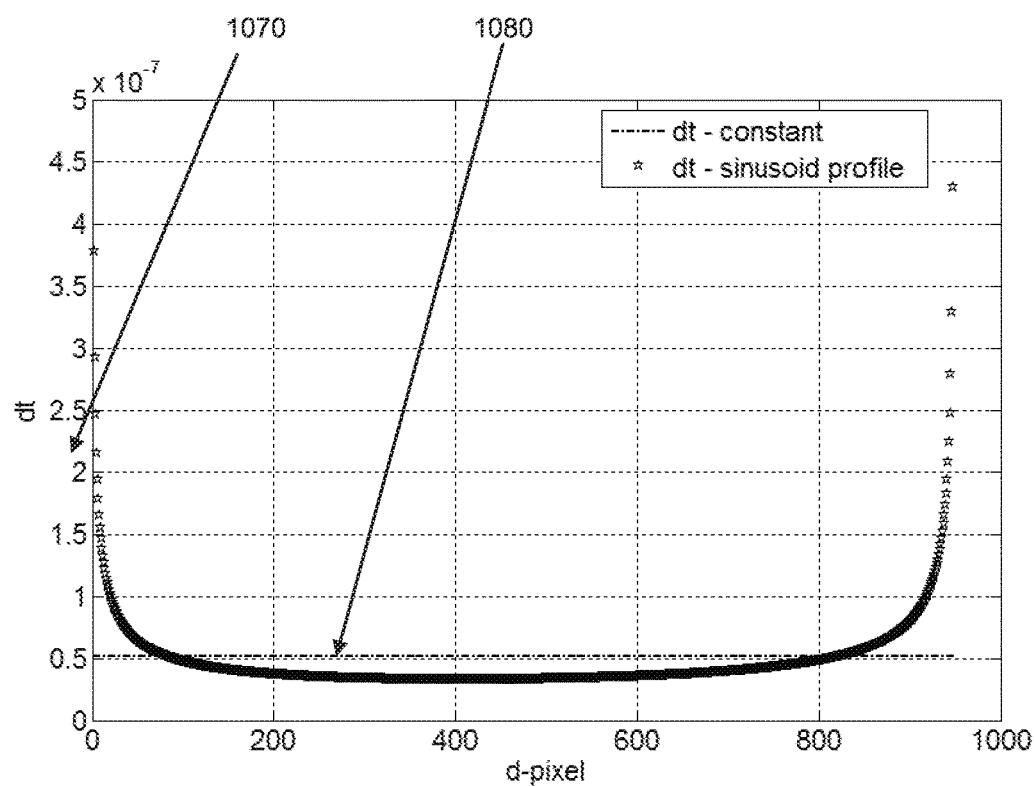
FIG. 17 illustrates a comparison between variable and constant scan speed.
Figure 18:
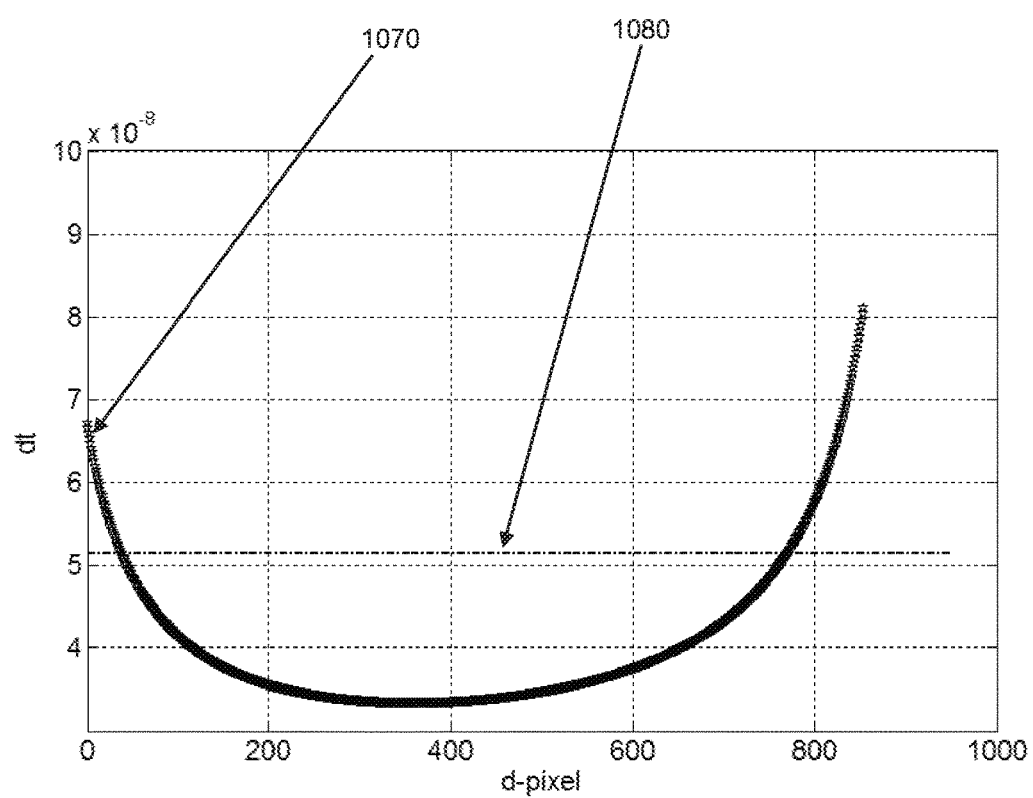
FIG. 18 illustrates a comparison between variable and constant scan speed, for middle pixels taken from FIG. 17.

FIG. 16 is a schematic sketch of a horizontal line including $N_h$ uniformly distributed pixels.

The uniformity of the image is generally ensured by providing an equal distance between the projected pixels along the line. This distance may be computed as a function of the maximal rotation angle and the laser impinging angle. FIG. 14a illustrates a case for which: $\alpha_L < \theta_{peak}^{Op,x}$.
The horizontal FOV in this case is as per the following Equation 4:

$$FOV_h = d_s (\tan(\alpha_L + \theta_{peak}^{Op,x}) + \tan(\alpha_L - \theta_{peak}^{Op,x}))$$

The distance between the projected pixels is derived from the FOV, via the following Equation 5:

$$dX_{pixel} = \frac{FOV_h}{N_h - 1}$$

A method for determining suitable single line synchronization is now described.

Computation of the variable time interval, in which each pixel is projected, is now described. The time interval of each pixel is determined from the velocity of the pixels, which is computed using differentiation of the mirror position. As described below with reference to Equations 19-25, the mirror velocity may be represented as Equation 6:

$$\frac{FOV_h}{(N_h - 1)} \frac{\cos^2(\alpha_L + \theta^{Op,x}(t))}{\omega_n d_s \theta_{peak}^{Op,x}} + dt \sin(\omega_n t) = 0$$

Equation 6 is a nonlinear equation, for the variable dt, which is multiplied by the time dependent term $\sin(\omega_n t)$. The term t can be represented using a recursive formulation e.g. as per Equation 7:

$$t(i) = t(i-1) + dt(i)$$

The above equation may be solved using numerical methods for algebraic nonlinear equations. In contrast, consider a mirror having constant speed. In that case, the time used to project a single pixel can be as per Equation 8:

$$dt_{lin}[\sec] = \frac{\text{Time per Line}}{N_h - 1}$$

The time used to project a single line may be determined from the resonance frequency in the horizontal direction. During one oscillating cycle, the mirror having constant speed projects two horizontal lines, thus the time used to project a single horizontal line is as per Equation 9:

$$\text{Time per Line}[\sec] = \frac{1}{2 f_n}$$

A method for determining uniformity and brightness of the projected image (step III of FIG. 23) is now described.

The correction described hereinbelow yields images with uniform brightness. The uniformity of the images is determined from the intensity of the laser, which is dependent on the 'on' time of the laser. The time for turning on the laser may be a function of the desired spatial location of the pixel along the horizontal line. Due to the mirror's time-dependent velocity along the horizontal axis, the time for projection of each pixel is not constant. Another parameter, the 'on time' of the laser, may be utilized to compensate for the variation of the brightness.

The horizontal FOV was computed in Equation 4, and the dimension of each pixel is defined from Equation 5. Assuming use of only 90% of the effective scan regime, define $FOV_{h,eff} = 0.9 * FOV_h$ and recompute the pixel size as Equation 10:

$$S_{pixel} = \frac{FOV_{h,eff}}{N_h}$$

Uniformity of the laser intensity for each of the pixels can be computed as per Equation 11:

$$Intensity_i = \frac{Power_i}{Area_i} = \frac{\text{Laser\_Energy}/\text{t\_on}_i}{\pi (\text{x\_on}_i)^2 / 4}$$

Where the index i refers to index of each pixel (i=1, 2, ..., $N_h$)

The parameters from Equation 11 are as defined above.

Define the pixel velocity (each pixel is projected at a different mirror velocity) as per Equation 12:

$$v_{p,i} = \frac{S_{pixel}}{dt_i}$$

where $S_{pixel}$ from Equation 10 is equal for all pixels, and $dt_i$ is the time duration for projection of pixel index i, computed from Equation 6.

The pixel diameter $x\_on_i$ is obtained when the mirror's velocity $v_{p,i}$ is multiplied by the time 'on' for the laser as per Equation 13:

$$x\_on_i = v_{p,i} \cdot t\_on_i = \frac{S_{pixel} \cdot t\_on_i}{dt_i}$$

Substitution of the expression from Equation 13 into the laser intensity yields Equation 14:

$$Intensity_i = \frac{4 \cdot \text{Laser\_Energy} \cdot dt_i^2}{\pi \cdot t\_on_i^3 \cdot S_{pixel}^2}$$

Define $C_1 = 4 \cdot \text{Laser\_Energy}/\pi \cdot S_{pixel}^2$ (constant).
The intensity of each pixel is as per Equation 15:

$$Intensity_i = C_1 \frac{dt_i^2}{t\_on_i^3}$$

This assumption means that the time duration for projection of each pixel ($dt_i$) is different than the time 'on' of the laser ($t\_on_i$).

The term $dt_i$ may be computed as per step 60 of FIG. 1 and/or FIG. 26 or as per Equation 6. Therefore, for a known value of $dt_i$, for example the value that is accepted at the minimum point of $dt_i$, and assuming $t\_on_i = dt_i$ for that point, compute the intensity of that pixel as per Equation 16:

$$Intensity_{min,dt} = \frac{C_1}{dt_{min}}$$

For all other points, the time t_on$_i$ for a uniform intensity can be computed by equating the term in Equation 16 to the general expression of Equation 15:

$$t\_on_i = \sqrt[3]{dt_i^2 dt_{min}}$$

Uniform Brightness

Referring to the variable dt computed in Equation 6, compute the on-time of the laser t_on$_i$ from Equation 17. FIG. 19 shows computation of the laser on-time from Equation 17.

A suitable computational method for deriving mirror position and velocity is now described with reference to Equations 19-25 below.

Based on Equation 2, the velocity of the pixels, i.e., the time interval between any two adjacent pixels, is computed from differentiation of Equation 2 with respect to time, yielding Equation 19:

$$\frac{dX_{Pixel,j}}{dt} = d_s \frac{d}{dt}\{\tan(\theta_j)\} = \frac{d_s}{\cos^2\theta_j} \frac{d\theta_j}{dt}$$

The term $\theta_j = (\alpha_L + \theta_j^{Op,x})$ in Equation 19 may be replaced with the rotation angle of the mirror, which is described via a sinusoidal profile with constant frequency as per Equation 20:

$$\theta^{M,x}(t) = \theta_{peak}^{OM,x} \cos(\omega_n t) = \frac{1}{2}\theta_{peak}^{Op,x} \cos(\omega_n t),$$

where:

$\omega_n = 2\pi f_n$ [rad/sec] is the resonance frequency of the mirror (in the x direction) and $\theta_{peak}^{M,x}$ is the mechanical maximum amplitude of the x axis.

Differentiation of the angular position vector with respect to time yields Equation 21:

$$\dot{\theta}^{M,x}(t) = \omega_n \theta_{peak}^{M,x} \sin(\omega_n t) = \frac{1}{2}\omega_n \theta_{peak}^{Op,x} \sin(\omega_n t)$$

Equation 21 shows that the velocity of the mirror in the x axis is time dependent, and implies that the projection speed of the pixels depends on the pixels' locations along the line. Equation 19 above describes the velocity of the pixels. Substitution of $\theta_j$ (t) as per Equation 22:

$$\theta_j = (\alpha_L + \theta^{Op,x}(t)) = (\alpha_L + 2\theta^{M,x}(t))$$

yields Equation 23:

$$\frac{dX_{Pixel,j}}{dt} = \frac{d_s}{\cos^2(\alpha_L + \theta^{Op,x}(t))}\left(-\omega_n \theta_{peak}^{Op,x} \sin(\omega_n t)\right)$$

Time vector t in Equation 23 may now be determined. Rearranging Equation 23, with $dX_{Pixel,j}$ taken from Equation 5, yields Equation 24:

$$\frac{FOV_h}{(N_h-1)} \frac{\cos^2(\alpha_L + \theta^{Op,x}(t))}{\omega_n d_s \theta_{peak}^{Op,x}} + dt \sin(\omega_n t) = 0$$

Equation 24 is a nonlinear equation, for the variable dt, which is multiplied by the time dependent term sin ($\omega_n$t). The term t can be represented using a recursive formulation, e.g. as per Equation 25:

$$t(i) = t(i-1) + dt(i)$$

This equation may for example be solved using numerical methods for algebraic nonlinear equations.

A suitable definition of the optical distortion utilized for pincushion correction is now described with reference to FIG. 20. FIG. 20 depicts a schematic sketch of both the horizontal and the vertical Fields of View before correction of the pincushion distortion. The left boundary of the image is trimmed according to the distance $\Delta x(j)$, which is computed as a function of the row index. Each row (j=1, 2, . . . , N$_v$, where N$_v$ is the number of horizontal rows) may have a different optical distortion, measured relatively to the vertical line appearing in the symmetry axis of the image (FIG. 20) which corresponds to the minimum point, or the location of the light of the middle line.

Knowing the velocity of the mirror at each area, the time for turning off the laser can be computed from the following formula:

$$t_2(=\Delta x(j)/v(x_m,j). \quad \text{(Equation 26)}$$

The time delay $t_2$ (j) is row dependent and may be computed separately for each row.

Referring now to FIGS. 24a-24d and 25, a suitable metric for defining the "closest" grid point in FIG. 1b, step 50 is now described with reference to FIGS. 24a-24c and with reference to FIG. 25 which is an example method for performing step 50 of FIG. 1b.

As described above with reference to FIGS. 1a-1b, the method typically employs "spatial" data (the 3D and 2D grids—Grids I, II and III), as well as "temporal" data representing points in time which is employed to "convert" these grids into a grid (in space) having constant differences (grid IV). An "original timing file" is generated when step 20 of FIG. 1a stores a time-stamp corresponding to each point thereby to match a point in time to each of the points in space (each grid element) both in grid I (dense 3D grid) and in grid II (dense 2D grid). It is appreciated that the original timing file comprises original data, denser than the matrix of time-stamps, which matches time information to every coordinate in space in grid III. The "original timing file" may store a time-vector t that defines, in step 10, the time discretization, defined by the laser modulation frequency.

The use, by the method of FIGS. 1a-1b, of both Spatial information and Temporal Information is further clarified by the following example:
Spatial information in the example includes the following:
In step 20, Grid I=dense grid on a 3D surface represented by X, Y, and Z coordinates. Typical length of each row is 7390, 600 rows, based on a resonance frequency of 10150 [Hz] and a laser modulation clock of 150 [MHz]. So size of X, Y and Z are {7390,600}.
In step 30, Grid II—A dense 2D grid (X, Y coordinates). Size of grid is also {7390,600}.
In step 40, Grid III—sparse grid, points lie on 2D plane, with constant delta_x Size of grid III is, say, {854,600} where first parameter (854 in the example) represents number of pixels per row.
In step 50, Grid IV, which identifies the points in grid II which are closest to grid III has Dimensions equal to those of grid III ({854,600} in the example).

Temporal information in the example includes:

In steps 20, 30: grid with 600 identical rows. The time vector is t=[0, 1, 2, . . . 7390]*dt and each row has identical time vector, so vector form can replace matrix form because since discretization of time is 1D, whereas discretization of space is 2D, all rows relate to the same temporal grid.

No Time information exists at step 40, since grid III is virtual.

For step 50, the Temporal information includes the matrix of time stamps, also termed herein the time to pixel-center matrix, which is a {854,600} grid points in time.

FIG. 24a represents one row of an example grid II derived in step 30. As shown in the illustrated example, the distance between the points along the row is not constant. Instead, the points are less crowded near the edges of each row and become crowded toward the middle of each row.

Referring now to FIGS. 24b-24d, a fourth grid, grid IV, that lies on the same 2D plane as Grid II, is now defined. Grid IV defines a constant distance between the points, as shown in FIG. 24b. It is appreciated that Grid IV is presented herein merely for clarification and need not actually be stored in computer memory. Instead, the value of the desired constant distance between points may be stored in computer memory.

FIG. 24c shows the grid of FIG. 24b superimposed onto Grid II generated in step 30.

In step 50 of FIG. 1b, the method typically searches for the set of points on Grid II generated in step 30, that are closest to each respective point in Grid IV of FIG. 24b. For example, if the points in each grid are numerated from left to right, the table of FIG. 24d illustrates (first line in the table of FIG. 24d) the points in Grid II which are closest to each of the points in Grid IV (second line in the table of FIG. 24d).

From the "original timing file", access time terms just for those points in grid II which match spatially i.e. fall closest to, the points in Grid IV. Store these grid II points e.g. in a data file termed herein "the time-to-pixel-center" matrix" also termed herein the matrix of time stamps. Generally, the matrix of time stamps used in step 50 comprises a time to pixel-center matrix as described herein, if pixel location is determined using pixel centers, so the two terms are sometimes used interchangeably herein. The "time-to-pixel-center" matrix, then, typically comprises digital time information ordered in rows and columns, where the time information stored at an individual row and at an individual column represents a time interval which if allowed to elapse from an initial t=0 time-point until time-on of the laser for an individual pixel located at the individual row and the individual column, ensures that all pixels in all rows and columns are equally distributed along the rows.

The method of FIG. 25 typically comprises some or all of the following steps, suitably ordered e.g. as follows:

Step 2510: given a dense 2D grid II, and a sparse 2D grid III, represented by matrices II, III respectively, whose dimensions match the total number of rows and columns of the grids, where the number of rows in grid II is equal to the number of rows in grid III Step 2520: Define an "allowed (tolerable) error", e.g. the difference between the pixels in grid II to the pixels in grid III, e.g. typically a numerical value in the order of magnitude of 50 [micro-meter] dependent on projection parameters such as but not limited to some or all of: resolution, distance from mirror to screen, size of projected image.

Step 2530: Define an index k running from 1 to the number of elements per row of grid II: k=1:1:length row (grid II)

Step 2540: For each of the lines in grid III (index i) do step 2550.

Step 2550: For each of the pixels along the line in grid III (index j), do steps 2560-2580.

Step 2560: Compute the distance between pixel(i,j) in grid III and pixel(i,k) in grid II Step 2570: Compare the distance computed in step 2560 to the allowed error defined in step 2520. IF distance<=error, return time-stamp information e.g. for the pixel(i,k) in grid II If distance>error, check next pixel (k=k+1).

Step 2580: Return the time-stamp information, which is typically a matrix whose dimensions equal those of grid III.

Regarding step 2550 of FIG. 25: There may be more than one pixel in grid II which yields an error smaller than the allowed error as defined in step 2520. The method may search for the pixel(i,j) in grid II with the minimum error, or alternatively may stop the search after the first pixel whose distance is less than the error, is found. Example:

location of pixel (i,j) grid III (in micro-meter) is: 15
Locations of nearest neighbors in grid II (in micro-meter) are:

| 7 | 11 | 13 | 13.5 | 13.8 | 14.2 | 14.6 | 15.1 | 15.3 | 16 |

Allowed error is 0.8 [micro-meter].
Using steps 2550-2560 to compute distance, the absolute values of the distances, for pixels a-j, are found to be:

| 8 | 4 | 2 | 1.5 | 1.2 | 0.8 | 0.4 | 0.1 | 0.3 | 1 |
| a | b | c | d | e | f | g | h | i | j |

So, pixels f to i satisfy the criterion of having an error smaller than or equal to 0.8 [micro-m]. The method may either stop the search at pixel f, or continue until pixel h, which has the minimal error.

FIG. 26 is an example method for performing step 60 of FIG. 1b by generating and uploading $(start\_p)_{i,j}$ and $(ending\_p)_{i,j}$ according to which the electrical circuit connected to the laser may turn the laser on and off respectively. The method of FIG. 26 typically comprises some or all of the illustrated steps, suitably ordered e.g. as shown.

FIG. 27 is a simplified flowchart illustration of a method for determining a time at which to start projection of an individual row j of an image to be projected. The method of FIG. 27 typically comprises some or all of the following steps, suitably ordered e.g. as follows:

Step 2900: operate mirror such that mirror fast scan axis is resonating

Step 2910: generate a digital signal H_Sync which toggles between two states, when mirror crosses a zero reference level. The frequency of the H_Sync signal is identical to the frequency of the mirror.

Step 2930: for each of projection lines j, do steps 2940-2970

Step 2940: wait for a rising\falling edge of the H_Sync signal

Step 2950: start counting $t_1$ measured relatively to rising\falling edge of the H_Sync Step 2960: start counting $t_2$ (j) measured relatively to $t_1$ Step 2970: Start projecting digital data file during "scan time for line j" Step 2980: after the time measured relatively to the rising\ falling edge of H_Sync is equal to $t_1+t_2$ (j)+"scan time for line j", turn off the laser Step 2990: increment j, return to step 2940.

Projection methods described herein reduce distortions using laser modulation due to the orientation of the laser with respect to the x-y axis of the mirror as shown and described. It is appreciated that if the laser is rotated by 90 [deg] and pincushion distortions are thereby rotated by 90 [deg], then pincushion effects may be visible on vertical lines if the laser is controlled for horizontal lines.

A particular advantage of certain embodiments of the present invention is that an image projector is achieved which:

a. is small and economical to manufacture by virtue of its having only a single RGB laser module and only a single mirror, from which a matrix of pixels is generated by virtue of the mirror's 2d pivoting motion, as opposed to providing one light source and mirror per pixel;

b. generates images which do not suffer from image distortion such as pincushion or keystone distortions.

c. is economical to operate in terms of energy since only a single light source is provided rather than one such per pixel.

d. generates equally spaced pixel centers hence does not unduly limit, or require advanced knowledge of, pixel widths, nor of the distance from which the image is to be projected.

Components described herein as software may, alternatively, be implemented wholly or partly in hardware and/or firmware, if desired, using conventional techniques. Included in the scope of the present invention, inter alia, are electromagnetic signals carrying computer-readable instructions for performing any or all of the steps or operations of any of the methods shown and described herein, in any suitable order including simultaneous performance of suitable groups of steps as appropriate. Any computations or other forms of analysis described herein may be performed by a suitable computerized method. Any step described herein may be computer-implemented. Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node. Conversely, features of the invention, including method steps, which are described for brevity in the context of a single embodiment or in a certain order may be provided separately or in any suitable subcombination or in a different order. The scale used to illustrate various elements in the drawings is merely exemplary and/or appropriate for clarity of presentation and is not intended to be limiting.

The invention claimed is:

1. A method for projecting n-dimensional images represented by pixels, where n does not exceed 2, onto an m-dimensional surface, using at least one laser which generates at least one coherent beam and is arranged to impinge upon at least one micro-mirror arranged for pivoting, at non-uniform angular velocity, about no more than two axes, so as to reflect the coherent beam sequentially over the entirety of said m-dimensional surface, the method comprising:

providing a computerized representation of a first, dense, grid of spatial 3D coordinates comprising a multiplicity of angular orientations of the mirror given a specific predefined operating modulating frequency of the laser; where the spatial 3D coordinates in space respectively correspond to a set of time-points that are evenly distributed along a time-dimension with constant time-discretization deltaT;

deriving a dense grid representation of an image to be displayed on the m-dimensional surface, from said first, dense, grid of spatial 3D coordinates, where the coordinates respectively correspond to said set of time-points;

defining a computerized representation of a sparse m-dimensional grid of second coordinates, which is sparser than said dense m-dimensional representation, wherein said second coordinates are spaced such that distances between any two adjacent coordinate sets along any row of said sparse m-dimensional grid are constant and the rows and the columns are aligned to resemble said image to be displayed on the m-dimensional surface; and finding, in said dense grid of first coordinates, the subset of coordinates that is closest to the said second sparser grid of coordinates, thereby to yield a third grid of m-dimensional spatial coordinates characterized in that if a laser is used to project a digitally represented image onto an m-dimensional surface, from a user-selected distance within the range of distances, and the laser operation is timed to project pixels whose locations respectively correspond to the said third grid, image distortion is prevented despite non-uniformity of said micro-mirror's angular velocity.

2. The method according to claim 1, wherein said providing a first, dense, grid includes computing the micromirror's pivoting motion as a function of the laser's modulation frequency.

3. The method according to claim 1, further comprising: providing a desired pixel width value suited to a user-selected distance, from among a range of distances, from which it is desired to project images of up to 2 dimensions onto the m-dimensional surface, and computing a laser-on time for each pixel, based on (a) information regarding desired pixel center locations derived from said third grid of m-dimensional spatial coordinates; and (b) said desired pixel width value.

4. The method according to claim 1, wherein providing a computerized representation of a first, dense, grid comprises pre-computing the first, dense grid such that deltaT is fixed over all positions in the first grid, wherein said deriving comprises deriving said dense grid representation such that deltaX is not fixed over all positions whereas deltaT is fixed over all positions and wherein said defining comprises defining a sparse m-dimensional grid such that deltaX is fixed over all positions.

5. The method according to claim 4, wherein deltaX is computed as a distance between adjacent points along a row of the said m-dimensional grid.

6. The method according to claim 1, wherein said providing a computerized representation of a first, dense, grid comprises:

using a processor for at least one of:
computing said first, dense, grid; and
storing a computerized representation of said first, dense, grid in computer storage.

7. The method according to claim 1, further comprising operating the laser to project a digitally represented image onto an m-dimensional surface, from a user-selected distance within the range of distances, wherein the laser operation is timed to project pixels whose locations correspond to said third grid, thereby to prevent image distortion despite non-uniformity of said micro-mirror's angular velocity.

8. The method according to claim 1, wherein defining comprises positioning said sparse m-dimensional grid's rows and columns of second coordinate pairs such that adjacent rows and adjacent columns are each separated by a uniform distance comprising a target resolution value at which images are to be projected on the surface.

9. A system for projecting n-dimensional images represented by pixels, where n does not exceed 2, onto an m-dimensional surface, the system being operative in conjunction with a laser which generates a coherent beam and is arranged to impinge upon a micro-mirror arranged for pivoting, at non-uniform angular velocity, about no more than two axes, so as to reflect the coherent beam sequentially over the entirety of said m-dimensional surface, the system comprising:

a processor configured and operable to:

provide a computerized representation of a first, dense, grid of spatial 3D coordinates comprising a multiplicity of angular orientations of the mirror given a specific predefined operating modulating frequency of the laser; where the spatial 3D coordinates in space respectively correspond to a set of time-points that are evenly distributed along a time-dimension with constant time-discretization deltaT;

derive a dense grid representation of an image to be displayed on the m-dimensional surface, from said first, dense, grid of spatial 3D coordinates, where the coordinates respectively correspond to said set of time-points;

define a computerized representation of a sparse m-dimensional grid of second coordinates, which is sparser than said dense m-dimensional representation, wherein said second coordinates are spaced such that distances between any two adjacent coordinate sets along any row of said sparse m-dimensional grid are constant and the rows and the columns are aligned to resemble said image to be displayed on the m-dimensional surface; and find, in said dense grid of first coordinates, the subset of coordinates pairs that is closest to the said second sparser grid of coordinates, thereby to yield a third grid of m-dimensional spatial coordinates; and a laser controller configured and operative to control the laser to project a digitally represented image onto an m-dimensional surface, from said distance, the laser projection being timed to project pixels whose locations respectively correspond to the said third grid, thereby to prevent image distortion despite non-uniformity of said micro-mirror's angular velocity.

10. The system according to claim 9, further comprising a micro-mirror arranged for pivoting, at non-uniform angular velocity, about no more than two axes, so as to reflect the coherent beam sequentially over the entirety of said surface.

11. The system according to claim 10, further comprising a laser which generates a coherent beam and is arranged to impinge upon the micro-mirror arranged for pivoting.

12. The system according to claim 9, further comprising a micro-mirror arranged for pivoting, at non-uniform angular velocity, about no more than two axes, so as to reflect the coherent beam sequentially over the entirety of said surface.

13. The system according to claim 12, further comprising an interface operative to provide a distance from said micro-mirror to said surface or from the laser device to the micro-mirror device.

* * * * *